US011571681B2

(12) United States Patent
Basheer et al.

(10) Patent No.: US 11,571,681 B2
(45) Date of Patent: Feb. 7, 2023

(54) AMINATED SILICEOUS ADSORBENT FROM RICE HUSK ASH AND A METHOD OF CAPTURING CARBON DIOXIDE

(71) Applicant: King Fahd University of Petroleum and Minerals, Dhahran (SA)

(72) Inventors: Chanbasha Basheer, Dhahran (SA); Isam H. Aljundi, Dhahran (SA); Rashed Saed Bakdash, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 415 days.

(21) Appl. No.: 16/782,560

(22) Filed: Feb. 5, 2020

(65) Prior Publication Data
US 2021/0237031 A1      Aug. 5, 2021

(51) Int. Cl.
*B01J 20/24* (2006.01)
*B01D 53/02* (2006.01)
(Continued)

(52) U.S. Cl.
CPC .............. *B01J 20/24* (2013.01); *B01D 53/02* (2013.01); *B01J 20/28059* (2013.01); *B01J 20/28061* (2013.01); *B01J 20/28071* (2013.01); *B01J 20/28083* (2013.01); *B01J 20/3078* (2013.01); *B01J 20/3085* (2013.01); *B01D 2253/20* (2013.01); *B01D 2253/304* (2013.01); *B01D 2253/306* (2013.01); *B01D 2253/311* (2013.01); *B01D 2257/504* (2013.01)

(58) Field of Classification Search
None
See application file for complete search history.

(56) References Cited

U.S. PATENT DOCUMENTS 7,850,012 B2    12/2010   Gibson et al.
8,470,074 B2     6/2013   Baugh et al.
(Continued)

FOREIGN PATENT DOCUMENTS

CN        106637259 A   *   5/2017
CN        110255568 A   *   9/2019
(Continued)

OTHER PUBLICATIONS

Zeng, et al. ; Swelling-agent-free synthesis of rice husk derived silica materials with large mesopores for efficient CO2 capture ; Chemical Engineering Journal 251 ; pp. 1-9 ; Apr. 24, 2014 ; 9 Pages.

(Continued)

*Primary Examiner* — Joseph D Anthony
(74) *Attorney, Agent, or Firm* — Oblon, McClelland, Maier & Neustadt, L.L.P.

(57) ABSTRACT

An aminated siliceous adsorbent, which is the reaction product of dried acidified rice husk ash having disordered mesopores and an amino silane, wherein amine functional groups are present on an external surface and within the mesopores of the dried acidified rice husk ash, and wherein the aminated siliceous adsorbent has a carbon content of 24 to 30 wt. %, based on a total weight of the aminated siliceous adsorbent. A method of making the aminated siliceous adsorbent and a method of capturing $CO_2$ from a gas mixture with the aminated siliceous adsorbent.

20 Claims, 13 Drawing Sheets

(51) Int. Cl.
    *B01J 20/30*    (2006.01)
    *B01J 20/28*    (2006.01)

(56) References Cited

U.S. PATENT DOCUMENTS

| | | |
|---|---|---|
| 8,491,705 B2 | 7/2013 | Choi et al. |
| 2018/0326395 A1 | 11/2018 | Fleming et al. |

FOREIGN PATENT DOCUMENTS

| | | | |
|---|---|---|---|
| ID | 2017/S/00682 | | 12/2017 |
| WO | WO 2020/169862 A1 | * | 8/2020 |

OTHER PUBLICATIONS

Bhagiyalakshmi, et al. ; Utilization of rice husk ash as silica source for the synthesis of mesoporous silicas and their application to CO adsorption through TREN/TEPA grafting ; Journal of Hazardous Materials, vol. 175, Issue 1-3 ; pp. 928-938 ; Mar. 15, 2010 ; Abstract Only ; 1 Page.

Zeng, et al. ; High-performance $CO_2$ capture on amine-functionalized hierarchically porous silica nanoparticles prepared by a simple template-free method ; Adsorption ; Sep. 22, 2015 ; 12 Pages.

\* cited by examiner

AMINATED SILICEOUS ADSORBENT FROM RICE HUSK ASH AND A METHOD OF CAPTURING CARBON DIOXIDE

BACKGROUND OF THE INVENTION

Field of the Invention

The present invention relates to an aminated siliceous adsorbent prepared from rice husk ash, and methods of capturing carbon dioxide ($CO_2$) with the aminated siliceous adsorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Silica-based mesoporous materials have many advantages, for example, high surface area and pore volume, high stability, unique pore structure characteristics, uniform pore size distributions, and combination flexibility with other materials (e.g., metal nanomaterials, or rare-earth elements). See T. Suteewong, S. M. Gruner, L. A. Estroff, U. Wiesner, H. Sai, and M. Bradbury, "Synthesis and Formation Mechanism of Aminated Mesoporous Silica Nanoparticles," *Chem. Mater., vol.* 24, pp. 3895-3905, 2012, incorporated herein by reference in its entirety. Mesoporous silica materials may thus be applied to wastewater treatment, air purification or gas separation, thermal insulation systems, oxygen and humidity sensors, and battery electrode applications. See S. Yu, D. Gu, B. Lin, X. Zhang, X. Shen, and S. Cui, "Preparation of amine-modified $SiO_2$ aerogel from rice husk ash for $CO_2$ adsorption," *J. Porous Mater.*, vol. 24, pp. 455-461, 2017, incorporated herein by reference in its entirety. In particular, mesoporous silica can be used as an adsorbent for uptake and release of gases with control of pore size and adsorption-desorption ability between adsorbate and adsorbent through chemical modification. See Y. Sun et al., "Quantification of amine functional groups on silica nanoparticles: a multi-method approach," *Nanoscale Adv.,* 2019; and T. Suteewong, S. M. Gruner, L. A. Estroff, U. Wiesner, H. Sai, and M. Bradbury, "Synthesis and Formation Mechanism of Aminated Mesoporous Silica Nanoparticles," *Chem. Mater.*, vol. 24, pp. 3895-3905, 2012, each incorporated herein by reference in its entirety.

There are several reports on the functionalization of the surface of mesoporous silica for structure control. For example, functionalization of mesoporous silica with organosilanes using post-synthetic grafting or co-condensation procedures have been reported to produce a uniform modified surface. However, if too high of an organosilane content is employed, the hierarchical structure of the mesoporous silica can be lost due to packing disruptions and/or changing the structure geometry. See T. Suteewong, S. M. Gruner, L. A. Estroff, U. Wiesner, H. Sai, and M. Bradbury, "Synthesis and Formation Mechanism of Aminated Mesoporous Silica Nanoparticles," *Chem. Mater.*, vol. 24, pp. 3895-3905, 2012, each incorporated herein by reference in its entirety. The surface functional groups can be identified and quantified using a variety of methods, such as NMR, FTIR, and Raman spectroscopy, Thermogravimetric analysis (TGA), elemental analysis to determine the content of the functional group, X-ray photoelectron spectroscopy (XPS) to identify the atomic composition, and titration techniques for acidic or basic functional groups. Based on the type of application of the material, it may be necessary to detect the surface groups and to determine their distribution. See Y. Sun et al., "Quantification of amine functional groups on silica nanoparticles: a multi-method approach," *Nanoscale Adv.,* 2019, incorporated herein by reference in its entirety.

Global warming is the result of an increase in greenhouse gases in the atmosphere, and $CO_2$ gas is considered the main contributing gas (up to 60%) of total greenhouse gases emissions. To reduce the impact of $CO_2$ gas, $CO_2$ capture utilization and storage technologies are widely applicable to reduce $CO_2$ emissions, but unfortunately, have proven costly. See X. Zhang et al., "Effects of hydrofluoric acid pre-deashing of rice husk on physicochemical properties and $CO_2$ adsorption performance of nitrogen-enriched biochar," *Energy*, vol. 91, no. 1, pp. 903-910, 2015, incorporated herein by reference in its entirety. Captured $CO_2$ can be utilized for other useful purposes in the chemical and related industries.

One such application involves methane upgrading. Methane is considered a green source for power generation in households, and the purification and upgrade of biogas ($CH_4$, $CO_2$, and $N_2$) to meet pure natural gas ($CH_4$) requirements (pipeline quality to avoid corrosion) can be achieved by effective cheap techniques to separate $CO_2$ and $N_2$ gas, such as absorption, cryogenic separation, membrane separation, distillation, and adsorption. See Zhang et al.; and H. Yi et al., "Adsorption separation of $CO_2$, $CH_4$, and $N_2$ on microwave activated carbon," *Chem. Eng. J.*, vol. 215-216, no. 1, pp. 635-642, 2013; M. S. Horikawa, F. Rossi, M. L. Gimenes, C. M. M. Costa, and M. G. C. da Silva, "Chemical absorption of H2S for biogas purification," *Brazilian J. Chem. Eng., vol.* 21, no. 3, pp. 415-422, September 2004; M. J. Tuinier and M. van Sint Annaland, "Biogas Purification Using Cryogenic Packed-Bed Technology," *Ind. Eng. Chem. Res.*, vol. 51, no. 15, pp. 5552-5558, April 2012; Z. Y. Yeo, T. L. Chew, P. W. Zhu, A. R. Mohamed, and S.-P. Chai, "Conventional processes and membrane technology for carbon dioxide removal from natural gas: A review," *J. Nat. Gas Chem.*, vol. 21, no. 3, pp. 282-298, May 2012; D. Aaron and C. Tsouris, "Separation of $CO_2$ from Flue Gas: A Review," *Sep. Sci. Technol.*, vol. 40, no. 1-3, pp. 321-348, January 2005; and N. Sun et al., "Surface-modified spherical activated carbon materials for pre-combustion carbon dioxide capture," *RSC Adv.*, vol. 5, no. 42, pp. 33681-33690, April 2015, each incorporated herein by reference in their entirety. Specifically, solid adsorbents are more effective and less expensive than liquid absorbents such as amine solvents which are volatile, cause corrosion, and involve high energy consumption for long-term applications. See Zhang et al.; Yi et al.; S. H. Moon and J. W. Shim, "A novel process for CO2/CH4 gas separation on activated carbon fibers-electric swing adsorption," *J. Colloid Interface Sci.*, vol. 298, no. 2, pp. 523-528, 2006; S. Khalili, B. Khoshandam, and M. Jahanshahi, "A comparative study of CO2 and CH4 adsorption using activated carbon prepared from pine cone by phosphoric acid activation," *Korean J. Chem. Eng.*, vol. 33, no. 10, pp. 2943-2952, 2016; N. Alvarez-Gutierrez, S. Garcia, M. V. Gil, F. Rubiera, and C. Pevida, "Dynamic Performance of Biomass-Based Carbons for $CO_2$/$CH_4$ Separation. Approximation to a Pressure Swing Adsorption Process for Biogas Upgrading," *Energy and Fuels*, vol. 30, no. 6, pp. 5005-5015, 2016; and S. J. Caldwell et al., "Carbon dioxide separation from nitrogen/hydrogen mixtures over activated carbon beads: Adsorption isotherms and breakthrough studies," *Energy and Fuels*, vol. 29, no. 6, pp. 3796-3807, 2015, each incorporated herein by reference in their entirety.

$CO_2$ capture as a physisorption process can be achieved by using activated carbon, silica gel, molecularly imprinted adsorbents, metal-organic frameworks (MOFs) and mesoporous molecular sieves. See S. Yu, D. Gu, B. Lin, X. Zhang, X. Shen, and S. Cui, "Preparation of amine-modified $SiO_2$ aerogel from rice husk ash for $CO_2$ adsorption," *J. Porous Mater.*, vol. 24, pp. 455-461, 2017, incorporated herein by reference in its entirety. The development of mesoporous materials is more attractive for adsorption of $CO_2$ due to the high porosity, high gas diffusion, and large pore volume. However, the adsorption capacity and selectivity of $CO_2$ on mesoporous materials is not good enough for real implementation, so the improvement of these materials is highly attractive. See F. Gao, J. Zhou, Z. Bian, C. Jing, J. Hu, and H. Liu, "Dynamic properties in $CO_2$ adsorption on amine-modified MCM-41," *J. Process Mech. Eng.*, vol. 227, no. 2, pp. 106-116, 2012, incorporated herein by reference in its entirety. The functionalization of mesoporous adsorbents with various types of amines enhances the interactions with $CO_2$ compared with microporous materials due to the formation of ammonium carbamates and carbonates reversibly at moderate temperature, thus enhancing the capacity and selectivity of $CO_2$ capture at ambient temperature. See N. H. Alias, K. S. N. Kamaruddin, and I. Bhatti, "$CO_2$ Separation using Modified MCM-41 in PSA System," *Int. J Chem. Environ. Eng.*, vol. 1, no. 2, pp. 85-90, 2010; T. L. Chew, A. L. Ahmad, and S. Bhatia, "Ordered mesoporous silica (OMS) as an adsorbent and membrane for separation of carbon dioxide ($CO_2$)," *Adv. Colloid Interface Sci.*, vol. 153, pp. 43-57, 2010; and A. Zukal, J. Jagiello, J. Mayerová, and J. Čejka, "Thermodynamics of $CO_2$ adsorption on functionalized SBA-15 silica. NLDFT analysis of surface energetic heterogeneity," *Phys. Chem. Chem. Phys.*, vol. 13, no. 34, pp. 15468-15475, 2011 each incorporated herein by reference in their entirety.

For example, Gao et al. studied the adsorption of carbon dioxide on MCM-41 (hierarchical mesoporous silica) modified with an amine groups at different temperatures, pressures, and concentrations of $CO_2$. See F. Gao, J. Zhou, Z. Bian, C. Jing, J. Hu, and H. Liu, "Dynamic properties in $CO_2$ adsorption on amine-modified MCM-41.

Kumar et al. used available commercial silica which was calcined at high temperature, and then functionalized with polyethyleneimine and APTS for carbon dioxide capture. See T. Sakpal, A. Kumar, S. Kamble, and R. Kumar, "Carbon dioxide capture using amine functionalized silica gel," *Indian J. Chem.*, vol. 51, pp. 1214-1222, 2012, incorporated herein by reference in its entirety.

SBA-15, another type of highly ordered mesoporous silica, has also been functionalized with polyethyleneimine for $CO_2$ adsorption, and the adsorption capacity was found to be highly affected by temperature variations. See N. Gargiulo, A. Peluso, P. Aprea, F. Pepe, and D. Caputo, "CO2 adsorption on polyethylenimine-functionalized SBA-15 mesoporous silica: Isotherms and modeling," *J. Chem. Eng. Data*, vol. 59, pp. 896-902, 2014, incorporated herein by reference in its entirety. In 2011, Zukal et al., investigated the adsorption behavior of SBA-15 functionalized with APTES to capture $CO_2$ at 273-333 K. See A. Zukal, J. Jagiello, J. Mayerová, and J. Čejka, "Thermodynamics of $CO_2$ adsorption on functionalized SBA-15 silica. NLDFT analysis of surface energetic heterogeneity," *Phys. Chem. Chem. Phys.*, vol. 13, no. 34, pp. 15468-15475, 2011, incorporated herein by reference in their entirety.

Amine-modified silica has been prepared from rice husk ash by leaching rice husk ash with sodium hydroxide to form sodium silicate, followed by using sol-gel processing to convert the sodium silicate into a silica aerogel, followed by amine functionalization with 3-APTES. The resulting amine-modified silica aerogel was reported to have a specific surface area of 654.24 $m^2/g$, a pore volume of 2.72 $cm^3/g$, and a pore diameter of 12.38 nm. See S. Yu, D. Gu, B. Lin, X. Zhang, X. Shen, and S. Cui, "Preparation of amine-modified $SiO_2$ aerogel from rice husk ash for $CO_2$ adsorption," *J. Porous Mater.*, vol. 24, pp. 455-461, 2017, incorporated herein by reference in its entirety.

Hydrogen fuel is classified as a promising safe energy source—both environmentally and geopolitically—due to the reduction in the consumption of fossil fuel and thus greenhouse gas emissions. See G. Melaet, V. Stavila, L. Klebanoff, and G. A. Somorjai, "The effect of aluminum and platinum additives on hydrogen adsorption on mesoporous silicates," *Phys. Chem. Chem. Phys.*, vol. 20, no. 17, pp. 12075-12083, 2018; and N. S. Suraweera, A. A. Albert, J. R. Humble, C. E. Barnes, and D. J. Keffer, "Hydrogen adsorption and diffusion in amorphous, metal-decorated nanoporous silica," *Int. J. Hydrogen Energy*, vol. 39, pp. 9241-9253, 2014, each incorporated herein by reference in their entirety.

Hydrogen fuel can be generated from fossil fuels or water with renewable sources of electricity. However, its application as a fuel source for vehicles is limited by storage issues. Hydrogen store has become an attractive area of research, including liquefaction, chemisorption in metal hydrides, compressed gas, physisorption on porous materials such as activated carbon (AC) and metal-organic frameworks (MOFs). To be useful, these different hydrogen storage techniques have to meet basic cost, safety, adsorption capacity, and adsorption-desorption rate requirements. See Suraweera et al.; D. A. Sheppard and C. E. Buckley, "Hydrogen adsorption on porous silica," *Int. J. Hydrogen Energy*, vol. 33, pp. 1688-1692, 2008; and D. K. Panchariya, R. K. Rai, E. A. Kumar, and S. K. Singh, "Silica rich MIL-101(Cr) for enhanced hydrogen uptake," *J. Porous Mater.*, vol. 14, no. 20, p. 3728-3735, 2019, each incorporated herein by reference in their entirety. Physisorption storage techniques have more advantages compared with chemisorption in terms of kinetics, high reversibility, and high stability.

For example, hydrogen adsorption on mesoporous silica SBA-15 has been reported where the SBA-15 was synthesized by a different method with a high surface area of 3274 $m^2/g$. See B. Bera and N. Das, "Synthesis of high surface area mesoporous silica SBA-15 for hydrogen storage application," *Int. J. Appl. Ceram. Technol.*, vol. 16, pp. 294-303, 2019, incorporated herein by reference in its entirety.

MOFs (MIL-101) modified with rice husk ash have been fabricated for hydrogen storage at low-pressure conditions. See D. K. Panchariya, R. K. Rai, E. A. Kumar, and S. K. Singh, "Silica rich MIL-101(Cr) for enhanced hydrogen uptake," *J. Porous Mater.*, vol. 14, no. 20, p. 3728-3735, 2019, incorporated herein by reference in its entirety.

The hydrogen adsorption on porous silica doped with different concentrations of zinc ions has been studied at 77 K and up to 45 bar. See D. A. Sheppard and C. E. Buckley, "Hydrogen adsorption on porous silica," *Int. J. Hydrogen Energy*, vol. 33, pp. 1688-1692, 2008, incorporated herein by reference in its entirety.

Recently, hydrogen adsorption was investigated on mesoporous silica in the presence of aluminum and platinum additives at 77 K, where the presence of Pt nanoparticles enhances the hydrogen uptake two fold. See G. Melaet, V.

Stavila, L. Klebanoff, and G. A. Somorjai, "The effect of aluminum and platinum additives on hydrogen adsorption on mesoporous silicates," *Phys. Chem. Chem. Phys.*, vol. 20, no. 17, pp. 12075-12083, 2018, incorporated herein by reference in its entirety.

Keffer et al. studied hydrogen adsorption on amorphous nanoporous silica loaded with OTiCl₃ or OSiMe₃ using adsorption isotherms at 77K and 300 K and at pressures up to 100 bar. See D. J. Keffer, "Hydrogen adsorption and diffusion in amorphous, metal-decorated nanoporous silica," *Int. J. Hydrogen Energy*, vol. 39, pp. 9241-9253, 2014, each incorporated herein by reference in their entirety.

However, there is still a need for new silica materials with selective adsorption of $CO_2$ gas for $CO_2$ capture technologies, as well as with hydrogen adsorption capabilities for use in hydrogen storage systems.

SUMMARY OF THE INVENTION

Accordingly, it is one object of the present invention to provide an aminated siliceous adsorbent, which is the reaction product of (i) dried acidified rice husk ash having disordered mesopores and (ii) an amino silane, wherein amine functional groups are present on an external surface and within the mesopores of the dried acidified rice husk ash, and wherein the aminated siliceous adsorbent has a carbon content of 24 to 30 wt. %, based on a total weight of the aminated siliceous adsorbent.

In some embodiments, the dried acidified rice husk ash has an oxygen content of 40 to 46 wt. % and a silicon content of 34 to 40 wt. %, each based on a total weight of the dried acidified rice husk ash.

In some embodiments, the amino silane contains one amino group per molecule.

In some embodiments, the amino silane is of formula (I)

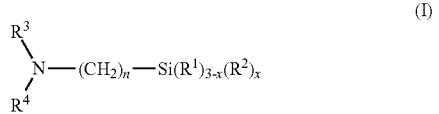

wherein
$R^1$ is an optionally substituted alkoxy, an optionally substituted aryloxy, or a halo;
$R^2$ is an optionally substituted alkyl, an optionally substituted aryl, or an optionally substituted arylalkyl;
$R^3$ and $R^4$ are independently hydrogen, an optionally substituted alkyl, an optionally substituted aryl, or an optionally substituted arylalkyl;
n is an integer of 2 to 16; and
x is 0, 1, or 2.

In some embodiments, $R^1$ is methoxy or ethoxy, $R^2$ is methyl, ethyl, phenyl, or benzyl, $R^3$ and $R^4$ are each hydrogen, n is 2 or 3, and x is 0 or 1.

In some embodiments, the amino silane is 3-aminopropyl triethoxysilane.

In some embodiments, the aminated siliceous adsorbent has an oxygen content of 35 to 41 wt. %, a silicon content of 28 to 34 wt. %, and a nitrogen content of 0.5 to 6 wt. %, each based on a total weight of the aminated siliceous adsorbent.

In some embodiments, the aminated siliceous adsorbent has a surface area of 90 to 110 m²/g, In some embodiments, the aminated siliceous adsorbent has a pore volume of 0.14 to 0.22 cm³/g.

In some embodiments, the aminated siliceous adsorbent has a mean pore diameter of 2.7 to 3.3 nm.

In some embodiments, the aminated siliceous adsorbent has a $CO_2$ uptake capacity of 0.4 to 0.46 mmol/g at 298 K and 1 atm, a $CO_2$ uptake capacity of 0.5 to 0.6 mmol/g at 273 K and 1 atm, and a $H_2$ uptake capacity of 1 to 1.4 mmol/g at 77 K and 1 atm.

In some embodiments, the aminated siliceous adsorbent has an ideal selectivity of $CO_2/N_2$ of 20 to 24, $CO_2/H_2$ of 10 to 14, and an ideal selectivity of $CO_2/CH_4$ of 6 to 10.

It is another object of the present disclosure to provide a method of making the aminated siliceous adsorbent, the method involving (i) ashing an acid treated rice husk at 600 to 800° C. for 1 to 12 hours to form a rice husk ash, (ii) acid treating the rice husk ash with hydrochloric acid to form an acidified rice husk ash, (iii) drying the acidified rice husk ash at 75 to 125° C. for 6 to 48 hours to form the dried acidified rice husk ash, and (iv) aminating the dried acidified rice husk ash with the amino silane at 100 to 140° C. for 12 to 48 hours.

In some embodiments, the amino silane is 3-aminopropyl triethoxysilane.

In some embodiments, the aminated siliceous adsorbent has an oxygen content of 35 to 41 wt. %, a silicon content of 28 to 34 wt. %, and a nitrogen content of 0.5 to 6 wt. %, each based on a total weight of the aminated siliceous adsorbent.

It is yet another object of the present disclosure to provide a method of capturing $CO_2$ from a gas mixture, involving contacting the gas mixture with the aminated siliceous adsorbent to adsorb at least a portion of the $CO_2$ into the aminated siliceous adsorbent, thereby forming a loaded aminated siliceous adsorbent and a gas stream depleted in $CO_2$ compared to the gas mixture.

In some embodiments, the gas mixture further contains at least one other gas selected from the group consisting of hydrogen, oxygen, nitrogen, methane, and carbon monoxide.

In some embodiments, the gas mixture is a pre-combustion gas mixture containing 15 to 50 vol. % of $CO_2$, based on a total volume of the gas mixture.

In some embodiments, the gas mixture is a post-combustion gas mixture containing 5 to 15 vol. % of $CO_2$, based on a total volume of the gas mixture.

In some embodiments, the gas stream depleted in $CO_2$ contains at least 25% less $CO_2$ by volume compared to a volume of $CO_2$ present in the gas mixture.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1A:
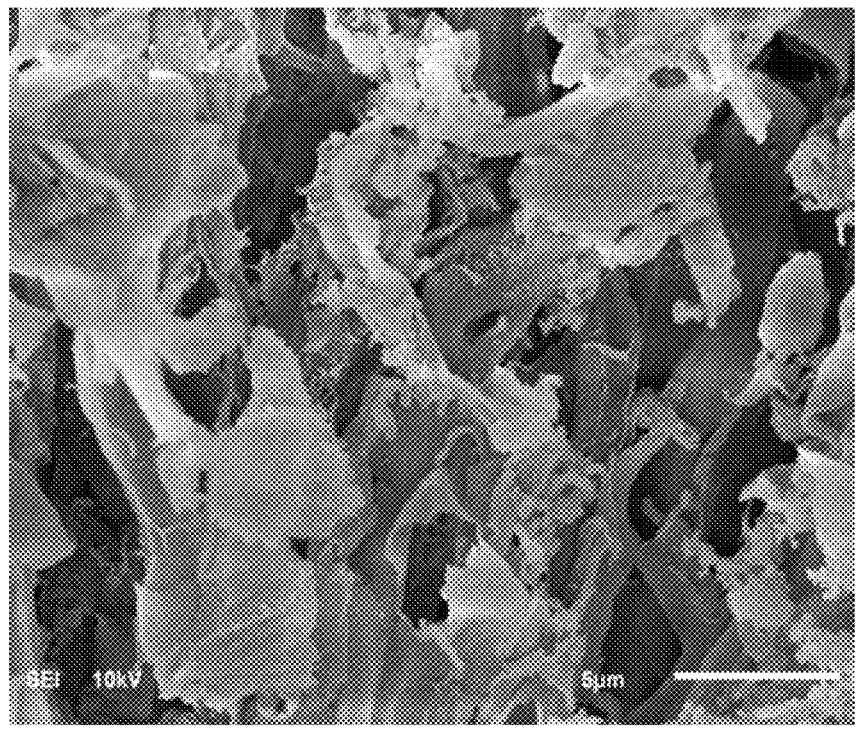
FIGS. 1A-1D are SEM micrographs and EDX analysis of RHA (FIGS. 1A and 1C) and an aminated siliceous adsorbent (ASiO₂) (FIGS. 1B and 1D)
Figure 1B:
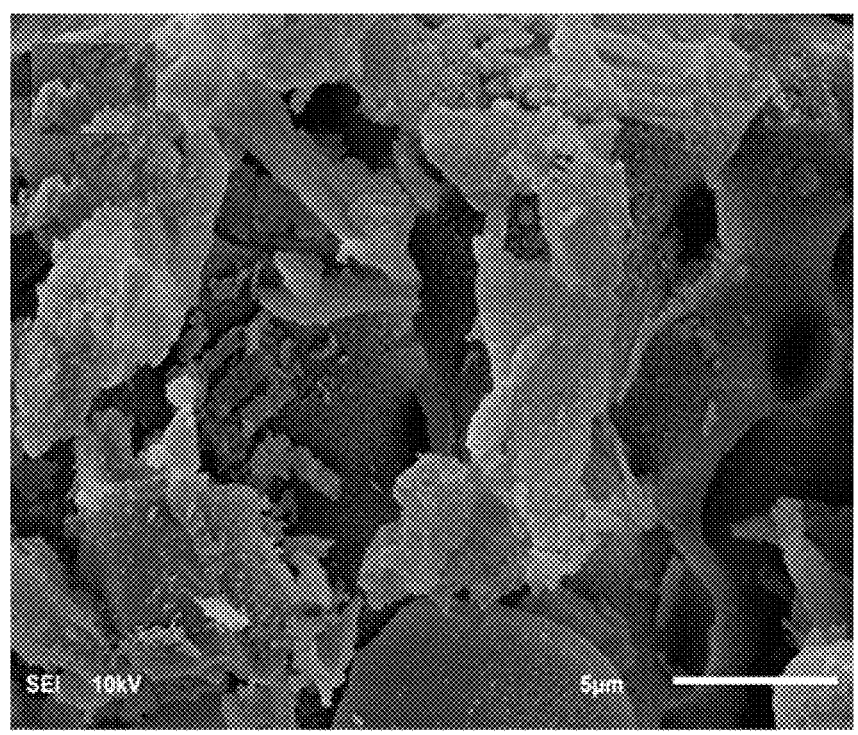
Figure 1C:
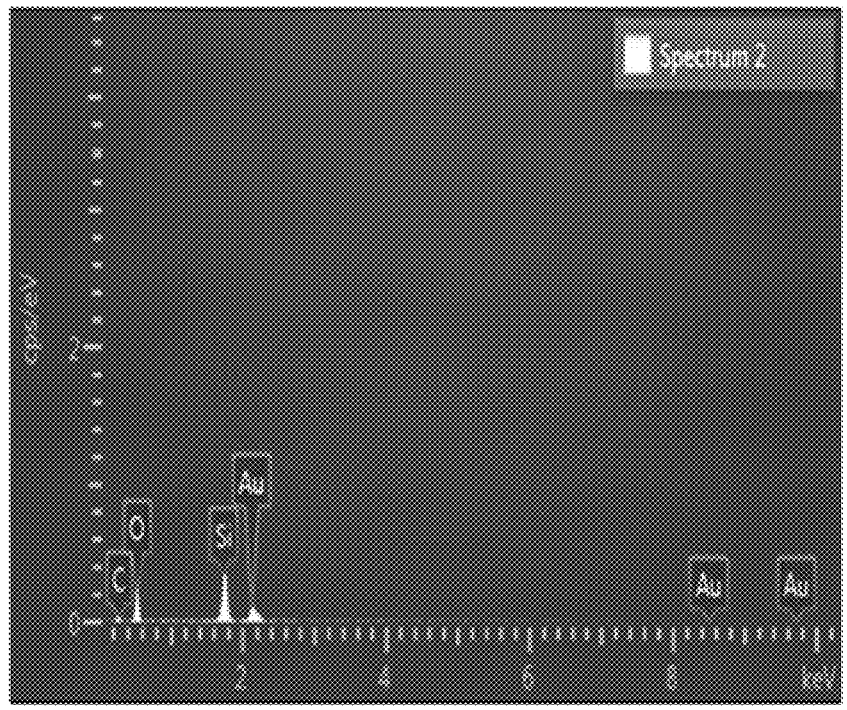
Figure 1D:
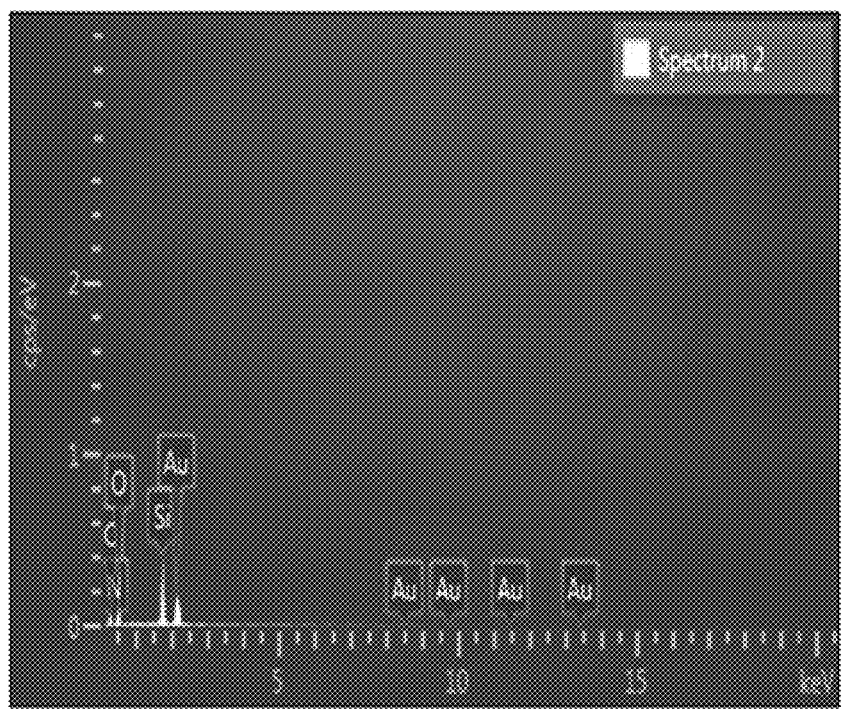

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic (non-aromatic) fragment having 1 to 26 carbon atoms, (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, etc.) and specifically includes, but is not limited to, saturated alkyl groups such as methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, tetradecyl, pentadecyl, hexadecyl, heptadecyl, octadecyl, nonadecyl, eicosyl, guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl); unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl; and cyclic alkyl groups (cycloalkyls) such as cyclopropyl, cyclobutyl, cyclopentyl, cyclohexyl, norbornyl, and adamantyl.

The term "aryl" means a carbocyclic aromatic monocyclic group containing 6 carbon atoms which may be further fused to a second 5- or 6-membered carbocyclic group which may be aromatic, saturated or unsaturated. Aryl includes, but is not limited to, phenyl, anthracenyl, indanyl, 1-naphthyl, 2-naphthyl, and tetrahydronaphthyl. The fused aryls may be connected to another group either at a suitable position on the cycloalkyl/cycloalkenyl ring or the aromatic ring.

The term "arylalkyl", as used herein, refers to a straight or branched chain alkyl moiety (as defined above) that is substituted by an aryl group (as defined above), examples of which include, but are not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkoxy" refers to an —O-alkyl group, specific examples of which include, but are not limited to, methoxy, ethoxy, propoxy (e.g., n-propoxy and isopropoxy), and t-butoxy. The term "aryloxy" refers to an —O-aryl group, specific examples of which include, but are not limited to, phenoxy and naphthoxy.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or arylalkyl), alkoxycarbonyl, aryl, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

Throughout the specification and the appended claims, a given chemical formula or name shall encompass all isomers (stereo and optical isomers and racemates) thereof where such isomers exist. Unless otherwise indicated, all chiral (enantiomeric and diastereomeric) and racemic forms are within the scope of the disclosure. Many geometric isomers of C=C double bonds, C=N double bonds, ring systems, and the like can also be present in the compounds, and all such stable isomers are contemplated in the present disclosure. Cis- and trans-(or E- and Z-)geometric isomers of the compounds of the present disclosure are described and may be isolated as a mixture of isomers or as separated isomeric forms. The present compounds can be isolated in optically active or racemic forms. Optically active forms may be prepared by resolution of racemic forms or by synthesis from optically active starting materials. All processes used to prepare compounds of the present disclosure and intermediates made therein are considered to be part of the present disclosure. When enantiomeric or diastereomeric products are prepared, they may be separated by conventional methods, for example, by chromatography, fractional crystallization, or through the use of a chiral agent. Depending on the process conditions the end products of the present disclosure are obtained either in free (neutral) or salt form. Both the free form and the salts of these end products are within the scope of the disclosure. If so desired, one form of a compound may be converted into another form. A free base or acid may be converted into a salt; a salt may be converted into the free compound or another salt; a mixture of isomeric compounds of the present disclosure may be separated into the individual isomers. Compounds of the present disclosure, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the disclosure. Further, a given chemical formula or name shall encompass all conformers, rotamers, or conformational isomers thereof where such isomers exist. Different conformations can have different energies, can usually interconvert, and are very rarely isolatable. There are some molecules that can be isolated in several conformations. For example, atropisomers are isomers resulting from hindered rotation about single bonds where the steric strain barrier to rotation is high enough to allow for the isolation of the conformers. It should be understood that all conformers, rotamers, or conformational isomer forms, insofar as they may exist, are included within the present disclosure.

As used herein, a "siliceous" material is one that contains silica as the principle constituent.

The term "ideal selectivity" refers to a ratio between the uptake capacity of gases, and can be calculated for example using single component isotherms by Henry's law.

Aminated Siliceous Adsorbent

The present disclosure provides an aminated siliceous adsorbent that contains a desirable content of amine functional groups on its surface, and that has suitable surface properties (e.g., BET surface area, pore volume, etc.) for use as a selective adsorbent of $CO_2$ gas for $CO_2$ capture technologies, as well as hydrogen gas at low temperatures for hydrogen storage applications (cryo-adsorptive hydrogen storage).

The aminated siliceous adsorbent of the present disclosure is the reaction product formed from reacting (i) dried acidified rice husk ash (porous siliceous material) with (ii) an amino silane. The reaction provides amino functional groups on an external surface and within the mesopores of the dried acidified rice husk ash which help facilitate the selective adsorption of certain gases such as $CO_2$ and $H_2$.

(i) Dried Acidified Rice Husk Ash

Rice husk ash (RHA) is an abundantly available and renewable agriculture byproduct from rice milling in rice-producing countries. Each grain of rice is protected with an outer hull (husk), and a rice mill separates the paddy plant into rice and the rice husk, the rice husk accounting for 17 to 24% of the rough weight of the harvested product. Rice husks consist of 71 to 87 wt. % organic materials such as cellulose and 13 to 29 wt. % inorganic materials. A significant portion of the inorganic fraction is silica ($SiO_2$), typically 80 to 92 wt. %. In fact, rice husk has the highest silica content among all plant residues. Currently, the inedible rice husks are used as a source of fuel, fertilizer, and in insulation applications. When rice husks are burned, a siliceous ash material is produced as a byproduct, and referred to as rice husk ash (RHA). While the constitution of rice husk ash may vary depending on a number of factors, such as the type of rice cultivated, the source/location of the rice cultivated, any chemical treatments prior to ashing, as well as the ashing conditions, the rice husk ash generally effective as a starting material herein is derived from a rice husk that has been subject to an acid treatment with an inorganic acid (e.g., sulfuric acid) prior to ashing to remove/minimize inorganic impurities such as calcium oxide, magnesium oxide, potassium oxide, iron oxide, titanium oxide, sodium, and the like, and the resulting rice husk ash typically comprises (each based on a total weight of the rice husk ash): an oxygen content of 40 to 46 wt. %, preferably 41 to 45 wt. %, preferably 42 to 44 wt. %, preferably 43 to 43.5 wt. %, and a silicon content of 34 to 40 wt. %, preferably 35 to 39 wt. %, preferably 36 to 38 wt. %, preferably 37 to 37.5 wt. %, and a carbon content of 10 to 22 wt. %, preferably 12 to 18 wt. %, preferably 14 to 16 wt. %, each based on a total weight of the rice husk ash. Preferably, the rice husk ash utilized herein contains primarily $SiO_2$ as the inorganic fraction, and has an inorganic impurity (e.g., calcium oxide, magnesium oxide, potassium oxide, iron oxide, titanium oxide, sodium) content of less than 4 wt. %, preferably less than 2 wt. %, preferably less than 1.5 wt. %, preferably less than 1 wt. %, preferably less than 0.5 wt. %, preferably less than 0.1 wt. %, preferably less than 0.05 wt. %.

The rice husk ash (RHA) employed herein is a mesoporous material, preferably a mesoporous material containing disordered mesopores. The risk husk ash is preferably semi-crystalline (semi-amorphous) by X-ray diffraction (XRD), having a distinct XRD pattern, but broad peaks (see e.g., FIG. 6). In some embodiments, the rice husk ash (RHA) has a pore size distribution ranging up to 12 nm, with a mean diameter of 3.31 to 3.45 nm, preferably 3.32 to 3.43 nm, preferably 3.34 to 3.41 nm, preferably 3.36 to 3.39 nm. In some embodiments, the rice husk ash (RHA) has a surface area (BET) of 200 to 240 $m^2/g$, preferably 210 to 230 $m^2/g$, preferably 220 to 225 $m^2/g$, preferably 222 to 223 $m^2/g$. In some embodiments, the rice husk ash has a pore volume of 0.22 to 0.26 $cm^3/g$, preferably 0.23 to 0.25 $cm^3/g$, preferably 0.24 to 0.249 $cm^3/g$, preferably 0.245 to 0.248 $cm^3/g$.

In some embodiments, the rice husk ash is in the form of particles, for example, particles having a particle size of 1 to 2,000 μm, preferably 5 to 1,500 μm, preferably 10 to 1,000 μm, preferably 20 to 900 μm, preferably 30 to 800 μm, preferably 40 to 700 μm, preferably 50 to 600 μm, preferably 75 to 500 μm, preferably 100 to 400 μm, preferably 150 to 300 μm.

The aminated siliceous adsorbent is preferably formed through activation of the rice husk ash prior to reaction with the amino silane. Activation may be performed by acid treating the rice husk ash, preferably acid treating the rice husk ash with hydrochloric acid and then drying as will be described in more detail hereinafter. The resulting activated material is referred to herein as "dried acidified rice husk ash". Dried acidified rice husk ash is substantially the same as the rice husk ash starting material described above in terms of its elemental composition and surface properties (porosity, BET surface area, mean pore size, pore volume, etc.). However and without being bound by theory, it is believed that acid treatment improves the coupling reaction with the amino silane by increasing the number of surface exposed Si—OH groups present on the rice husk ash surface which are capable of reacting with a hydrolyzable silane group of the amino silane. Therefore, a higher amino silane loading is possible on the dried acidified rice husk ash coupling partner than would be possible on rice husk ash which has not been subject to activation (acid treatment and drying).

(ii) Amino Silane

The amino silane may be any reactive (hydrolyzable) silane that contains at least one amino group per molecule (e.g., 1, 2, 3, 4 or more amino groups), for example up to 3 amino groups per molecule, preferably 1 or 2 amino groups per molecule, preferably exactly one amino group per molecule. In the present disclosure, each amino group of the amino silane (and each amino group of the amino silane in reacted form in the aminated siliceous adsorbent) is a basic amino group (non-protonated/non-cationic ammonium form) to allow for interaction with $CO_2$ molecules. The amino group(s) may be a primary amino group ($H_2N$—R), a secondary amino group (R—N(H)—R), a tertiary amino group (R—N(R)—R), or a mixture thereof when more than one amino group is present, preferably the amino group(s) is/are a primary amino group.

In addition to containing at least one amino group per molecule, the amino silane also includes at least 1 reactive silane group (e.g., 1, 2, 3, 4 or more reactive silane groups) per molecule. A reactive silane group is any silane which has at least one hydrolyzable group bonded directly to a Si atom. Hydrolyzable group(s) bonded directly to a Si atom include, but are not limited to, alkoxy groups (e.g., methoxy, ethoxy, propoxy, isopropoxy, t-butoxy, as well as substituted variants), aryloxy groups (e.g., phenoxy), and halo groups (e.g., chloro, bromo), including mixtures thereof. Each reactive silane group may therefore have one, two, or three hydrolyzable groups, which may be the same or different, preferably the same, more preferably each hydrolyzable group present is a methoxy.

Exemplary amino silanes which contain more than one amino group per molecule (e.g., 2, 3) and one reactive silane group per molecule include, but are not limited to, N-(3-(trimethoxysilyl)propyl)ethane-1,2-diamine (AEAPTMS), trimethoxysilylpropyldiethylenetriamine, and trimethoxysilylpropyl polyethyleneimine.

In preferred embodiments, the amino silane contains one amino group per molecule, preferably one primary amino group per molecule, preferably one amino group per molecule and one reactive silane group per molecule. Particularly preferred amino silanes are those of formula (I)

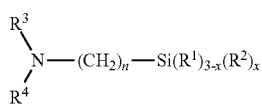
(I)

wherein $R^1$ is a hydrolyzable group such as an optionally substituted alkoxy, an optionally substituted aryloxy, or a halo;

$R^2$ is an optionally substituted alkyl, an optionally substituted aryl, or an optionally substituted arylalkyl;

$R^3$ and $R^4$ are independently hydrogen, an optionally substituted alkyl, an optionally substituted aryl, or an optionally substituted arylalkyl;

n is an integer of 2 to 16; and x is 0, 1, or 2.

In preferred embodiments, $R^1$ is an optionally substituted alkoxy group, preferably an unsubstituted alkoxy group, with methoxy, ethoxy, propoxy, isopropoxy being preferred, and with methoxy or ethoxy being most preferred.

In some embodiments, when present, $R^2$ is an optionally substituted $C_1$ to $C_6$ alkyl, preferably an optionally substituted $C_2$ to $C_5$ alkyl, preferably an optionally substituted $C_3$ to $C_4$ alkyl, preferably an unsubstituted alkyl, for example, methyl, ethyl, or propyl. In some embodiments, when present, $R^2$ is an optionally substituted aryl, preferably an unsubstituted aryl, preferably phenyl. In some embodiments, when present, $R^2$ is an optionally substituted $C_7$ to $C_{13}$ arylalkyl, or an optionally substituted $C_8$ to $C_{12}$ arylalkyl, or an optionally substituted $C_9$ to $C_{11}$ arylalkyl, preferably an unsubstituted arylalkyl with benzyl being the most preferable.

$R^3$ and $R^4$ may be the same or different, preferably the same. In some embodiments, $R^3$ and $R^4$ are hydrogen. In some embodiments, $R^3$ and $R^4$ are an optionally substituted alkyl for example, an optionally substituted $C_1$ to $C_6$ alkyl, preferably an optionally substituted $C_2$ to $C_5$ alkyl, preferably an optionally substituted $C_3$ to $C_4$ alkyl, with methyl, ethyl, propyl, 2-hydroxyethyl, and 3-hydroxypropyl being the most preferred. In preferred embodiments, $R^3$ and $R^4$ are each hydrogen (primary amino group).

In preferred embodiments, n is 2 to 10, or 3 to 8, or 4 to 6, preferably n is 2 or 3, preferably 3. In preferred embodiments, x is 0 or 1, preferably 0.

Exemplary amino silanes which contain one amino group per molecule include, but are not limited to, 3-aminopropyl triethoxysilane (APTES), 3-aminopropyl trimethoxysilane (APTMS), 2-aminoethyltrimethoxysilane, 4-aminobutyltriethoxysilane, 5-aminopentyltrimethoxysilane, 6-aminohexylltrimethoxysilane, 7-aminoheptyltriethoxysilane, bis-(2-hydroxyethyl)-3-aminopropyltriethoxysilane, with specific mention being made to 3-aminopropyl triethoxysilane (APTES).

Reaction with the amino silane provides amino functional groups on various surfaces of the dried acidified rice husk ash. In some embodiments, amine functional groups (from the amino silane) are present on both the external surface of the dried acidified rice husk ash particles as well as within the pore spaces (mesopores) of the dried acidified rice husk ash. External surfaces are those accessible surfaces which are located at or above the basal plane of the aminated siliceous adsorbent particle (not within a pore). On the other hand, surfaces within the pore spaces of the aminated siliceous adsorbent are regarded as internal surfaces since they lie below the basal plane of the aminated siliceous adsorbent particle. In other words, even though a pore wall may be considered an 'external' surface since it is connected to and accessible from the outside environment, because the pore wall is located beneath the basal plane it is considered to be in an internal surface herein.

The aminated siliceous adsorbent may be the reaction product formed from reacting (i) the dried acidified rice husk ash (porous siliceous material) with (ii) a single amino silane or a mixture of two or more amino silanes. Preferably, a single amino silane is used, more preferably a single amino silane having one amino group per molecule (e.g., APTES) is used, more preferably the dried acidified rice husk ash is functionalized with only a single amino silane having one amino group per molecule (e.g., APTES), and no other amino silane is used, for example, no amino silane bearing two or more amino groups is used for functionalization.

In preferred embodiments, the aminated siliceous adsorbent is formed only from functionalization of the (i) the dried acidified rice husk ash with (ii) the amino silane, and no other functionalization agents are used to functionalize the dried acidified rice husk ash surface. Such other functionalization agents may include, but are not limited to, non-amine bearing silanes such as alkyl silanes such as methyltrimethoxysilane, methyltriethoxysilane, dimethyldiethoxysilane, ethyltrimethoxysilane, trimethylethoxysilane, dimethyldimethoxysilane, propyltriethoxysilane, propyltrimethoxysilane, isobutyltriethoxysilane, hexyltrimethoxysilane, hexyltriethoxysilane, cyclohexyltriethoxysilane, cyclohexyltributoxysilane, heptyltrimethoxysilane, heptyltriethoxysilane, octyltrimethoxysilane, octyltriethoxysilane, methyloctyldimethoxysilane, methyloctyldiethoxysilane, nonyltrimethoxysilane, nonyltriethoxysilane, decyltrimethoxysilane, decyltriethoxysilane, dodecyltrimethoxysilane, dodecyltriethoxysilane, tetradecyltrimethoxysilane, tetradecyltriethoxysilane, octadecyltrimethoxysilane, and octadecyltriethoxysilane;

aryl silanes such as ethoxy(diphenyl)vinyl silane, trichloro[4-(chloromethyl)phenyl] silane, dimethoxy(diphenyl) silane, diethoxy(diphenyl) silane, diethoxy(methyl)phenyl silane, trichloro(phenyl) silane, triethoxy(phenyl) silane, and trimethoxy(phenyl) silane;

arylalkylsilanes such as trimethoxy(2-phenylethyl) silane;

orthosilicates such as tetraethyl orthosilicate (TEOS), tetramethyl orthosilicate, tetrapropyl orthosilicate, tetrabutyl orthosilicate, tetraallyl orthosilicate, tetrakis(dimethylsilyl) orthosilicate, and tetraamyl orthosilicate;

halo- or glycidyl-containing silanes such as (3-glycidyloxypropyl) trimethoxysilane (GTPMS), [2-(3,4-epoxycyclohexyl)ethyl]trimethoxysilane, and chloropropyltrimethoxysilane; and fluoroalkylsilanes such as 1,1,2,2-perfluorooctyl-trichlorosilane (PFOTS), (heptadecafluoro-1,1,2-2-tetrahydrodecyl)triethoxysilane, (3,3,3-trifluoropropyl)trimethoxysilane, heptadecafluoro-1,1,2,2-tetrahydrodecyl)trichlorosilane, chlorodimethyl(pentafluorophenyl)silane, chloromethyl)methylbis(pentafluorophenyl)silane, diisopropyl(3,3,4,4,5,5,6,6,6-nonafluorohexyl)silane, diisopropyl(3,3,4,4,5,5,6,6,7,7,8,8,8-tridecafluorooctyl)silane, trichloro(3,3,3-trifluoropropyl)silane, trichloro(3,3,4,4,5,5,6,6,7,7,8,8,8-tridecafluorooctyl)silane, triethoxy(4-(trifluoromethyl)phenyl)silane, and tridecafluoro-1,1,2,2-tetrahydrooctyl)trimethoxysilane;

Such other functionalization agents may also include, but are not limited to, polymeric functionalization materials such as polyamines (e.g., polyethyleneimines and polyazetidines for example diethylenetriamine, triethylenetetramine, tetratethylenepentamine, etc.), polyamides, epoxy resins (e.g., epoxy chloropropane), peptides, and polyalkylene glycols for example polyethylene glycol.

While the use of intermediate coating/functionalization layers are contemplated, in general the dried acidified rice husk ash of the present disclosure is directly functionalized with the amino silane, and no intermediate coating layers, binding layers, or functionalization layers are present. For example, the dried acidified rice husk is typically not pre-coated or otherwise pre-treated with a silica coating, a magnesium silicate coating, etc. such as those precipitated silica coatings described in US 2018/0326395A1—incorporated herein by reference in its entirety, or other binding layer (e.g., epoxy chloropropane, chloropropyltrimethoxysilane), prior to functionalization with the amino silane.

As a result of the reaction between (i) the dried acidified rice husk ash with (ii) the amino silane, the aminated siliceous adsorbent is produced. The elemental constitution of the aminated siliceous adsorbent may vary depending on a number of factors, such as the rice husk ash (dried acidified rice husk ash) employed in the functionalization process, the amino silane employed in the functionalization process, the relative ratio of the (i) and (ii) (the extent of amine functional group installation), etc. However, the aminated siliceous adsorbent effective in the methods herein generally comprises:

carbon in an amount of 24 to 30 wt. %, preferably 25 to 29 wt. %, preferably 26 to 28 wt. %, preferably 27 to 27.8 wt. %, preferably 27.4 to 27.6 wt. %;

oxygen in an amount of 35 to 41 wt. %, preferably 36 to 40 wt. %, preferably 37 to 39 wt. %, preferably 38 to 38.8 wt. %, preferably 38.1 to 38.6 wt. %, preferably 38.2 to 38.4 wt. %;

silicon in amount of 28 to 34 wt. %, preferably 29 to 33 wt. %, preferably 30 to 32 wt. %, preferably 31 to 31.5 wt. %; and nitrogen in an amount of 0.5 to 6 wt. %, preferably 1 to 5.5 wt. %, preferably 1.5 to 5 wt. %, preferably 2 to 4.5 wt. %, preferably 2.5 to 4 wt. %, preferably 3 to 3.5 wt. %, each based on a total weight of the aminated siliceous adsorbent.

In some embodiments, the aminated siliceous adsorbent is in the form of particles having a particle size of 1 to 2,000 μm, preferably 5 to 1,500 μm, preferably 10 to 1,000 μm, preferably 20 to 900 μm, preferably 30 to 800 μm, preferably 40 to 700 μm, preferably 50 to 600 μm, preferably 75 to 500 μm, preferably 100 to 400 μm, preferably 150 to 300 μm. Like the rice husk ash, the aminated siliceous adsorbent is preferably semi-crystalline (semi-amorphous) by X-ray diffraction (XRD), having a distinct XRD pattern, but broad peaks (see e.g., FIG. 6).

Owing at least in part to the functionalization with the amino silane, which without being bound by theory may act to partially obstruct the pores of the rice husk ash, the aminated siliceous adsorbent herein may have a reduced BET surface area and pore volume, and in some cases a drastically reduced BET surface area and pore volume, compared to the parent rice husk ash. In some embodiments, the aminated siliceous adsorbent has a surface area (BET) of 90 to 110 m$^2$/g, preferably 92 to 108 m$^2$/g, preferably 94 to 106 m$^2$/g, preferably 96 to 104 m$^2$/g, preferably 98 to 102 m$^2$/g, preferably 99 to 101.5 m$^2$/g, preferably 100 to 101 m$^2$/g, preferably 100.5 to 100.9 m$^2$/g. In some embodiments, the aminated siliceous adsorbent has a pore volume of 0.14 to 0.22 cm$^3$/g, preferably 0.15 to 0.21 cm$^3$/g, preferably 0.16 to 0.20 cm$^3$/g, preferably 0.165 to 0.19 cm$^3$/g, preferably 0.17 to 0.18 cm$^3$/g, preferably 0.175 to 0.179 cm$^3$/g. In some embodiments, the aminated siliceous adsorbent has a mean pore diameter of 2.7 to 3.3 nm, preferably 2.8 to 3.25 nm, preferably 2.9 to 3.2 nm, preferably 3.0 to 3.15 nm, preferably 3.05 to 3.1 nm, preferably 3.09 to 3.099 nm.

The aminated siliceous adsorbent of the present disclosure has an effective adsorption capacity for $CO_2$, which can be determined by thermodynamic, low pressure, single component gas adsorption isotherms. For example, the aminated siliceous adsorbent may have a $CO_2$ uptake capacity of 0.4 to 0.46 mmol/g, preferably 0.41 to 0.455 mmol/g, preferably 0.42 to 0.45 mmol/g, preferably 0.43 to 0.44 mmol/g at 298 K and 1 atm, and a $CO_2$ uptake capacity of 0.5 to 0.6 mmol/g, preferably 0.51 to 0.59 mmol/g, preferably 0.52 to 0.58 mmol/g, preferably 0.53 to 0.57 mmol/g, preferably 0.54 to 0.56 mmol/g at 273 K and 1 atm.

The aminated siliceous adsorbent of the present disclosure may also have an effective adsorption capacity for $H_2$ at low temperatures with a $H_2$ uptake capacity of 1 to 1.4 mmol/g, preferably 1.05 to 1.35 mmol/g, preferably 1.1 to 1.3 mmol/g, preferably 1.15 to 1.25 mmol/g, preferably 1.2 to 1.22 mmol/g, at 77 K and 1 atm.

The aminated siliceous adsorbent of the present disclosure is also selective towards adsorption of $CO_2$ and is therefore useful for various $CO_2$ capture applications. For example, the aminated siliceous adsorbent may have (at 298K) an ideal selectivity of $CO_2/N_2$ of 20 to 24, preferably 20.5 to 23, preferably 21 to 22.5, preferably 21.5 to 22; an ideal selectivity of $CO_2/H_2$ of 10 to 14, preferably 11 to 13.5, preferably 11.5 to 13, preferably 12 to 12.5, preferably 12.3 to 12.4; and an ideal selectivity of $CO_2/CH_4$ of 6 to 10, preferably 7 to 9.5, preferably 7.5 to 9, preferably 8 to 8.9, preferably 8.5 to 8.8, preferably 8.6 to 8.7; as calculated using single component isotherms by Henry's law.

As the composition of rice husk generally differs from the composition of other rice paddy parts (e.g., rice grain, etc.) and other plants or agricultural products, the aminated siliceous adsorbent herein obtained from rice husk ash processing (as will be described in more detail hereinafter) generally has a different composition from siliceous materials obtained from the ashing of other plants or agricultural products. The aminated siliceous adsorbent is preferably substantially free of ashed/comminuted materials sourced from other plants or agricultural products. Such ashed/comminuted materials include those sourced from the husks, shells, stems, roots, leaves (or fronds or leaflets), cores, trunks, inflorescences, fruit, pulp, empty fruit bunches, seeds (pit), or the offshoots of various other plants or agricultural products including, but not limited to, the seeds/nuts and/or seed/nut shells or hulls of almond, brazil, cocoa bean, coconut, cotton, flax, grass, linseed, maize, millet, oat, peach, apricot, date pit (e.g., date stones), peanut, rye, soybean, sunflower, walnut, wheat; rice straw; rice bran; crude pectate pulp; peat moss fibers; flax; cotton; cotton linters; wool; sugar cane; jute stick; neem leaves; paper; bagasse; bamboo; corn stalks; wood (e.g., wood chips); wood pulp (that remain after wood processes (e.g., sawdust from sawmills or lumber yards); bark; straw (e.g., wheat straw); pine cone; cork; dehydrated vegetable matter; whole ground corn cobs; corn stalks; corn cob light density pith core; corn cob ground woody ring portion; corn cob chaff portion; cotton seed stems; flax stems; wheat stems; sunflower seed stems; soybean stems; maize stems; rye grass stems; millet stems; cellulosic fibers; cellulose; coconut palm materials (e.g., coconut shells, coconut husks); oil palm materials (e.g., palm oil fuel ash, palm oil fibers, palm oil shells, palm oil empty fruit brunches).

Furthermore, while combinations of the aminated siliceous adsorbent of the present disclosure with other sieving materials is contemplated, preferably the aminated siliceous adsorbent of the present disclosure is made from only (i) the dried acidified rice husk ash and (ii) the amino silane, and no other sieving materials are present. Exemplary other sieving materials include, but are not limited to, hierarchical mesoporous silicates and aluminosilicates (zeolites) such as MCM-41, dendritic silica mesoporous, SBA-15, and ZSM-5; carbonaceous materials such as activated carbon; and molecular organic frameworks (MOFs) such as HKUST-1, ZIFs (e.g., ZIF-90), and UiO-66.

Methods of Making the Aminated Siliceous Adsorbent

The present disclosure also provides methods for making the aminated siliceous adsorbent, which originates from abundantly available and renewable agriculture byproduct rice husk.

Briefly, raw (untreated) rice husks are obtained, which as discussed above contain various impurities such as calcium oxide, magnesium oxide, potassium oxide, iron oxide, titanium oxide, sodium, and the like. To remove/minimize such impurities, the raw rice husk is preferably subject to an acid treatment. Here, the rice husk may be washed with water (e.g., double distilled water) followed by an inorganic acid such as HCl, sulfuric acid, phosphoric acid, perchloric acid, preferably sulfuric acid. In some embodiments, a concentration of the inorganic acid used in the acid treatment process may range from 0.5 to 5 M, preferably 0.6 to 4 M, preferably 0.7 to 3 M, preferably 0.8 to 2 M, preferably 0.9 to 1.5 M, preferably 1 to 1.2 M. The raw rice husks may be washed with a quantity of inorganic acid that provides desirable impurity levels (total impurity content of calcium oxide, magnesium oxide, potassium oxide, iron oxide, titanium oxide, and sodium) of less than 4 wt. %, preferably less than 2 wt. %, preferably less than 1.5 wt. %, preferably less than 1 wt. %, preferably less than 0.5 wt. %, preferably less than 0.1 wt. %, preferably less than 0.05 wt. %. After the acid treatment, the material may be dried (e.g., in an oven) at a temperature of 75 to 150° C., preferably 80 to 140° C., preferably 90 to 130° C., preferably 100 to 120° C., for 12 to 48 hours, preferably 20 to 30 hours, preferably 24 to 26 hours, to provide an acid treated rice husk.

Next, the rice husk, preferably the acid treated rice husk, is ashed (e.g., in a furnace) in open atmosphere at 600 to 800° C., preferably 640 to 780° C., preferably 680 to 760° C., preferably 700 to 740° C., preferably 710 to 730° C., preferably 720 to 725° C. for 1 to 12 hours, preferably 2 to 12 hours, preferably 3 to 10 hours, preferably 4 to 9 hours, preferably 5 to 8 hours, preferably 6 to 7 hours to form the rice husk ash.

The rice husk ash may then be activated prior to amination. Activation may be performed by acid treating the rice husk ash, for example by acid treating the rice husk ash with an inorganic acid such as hydrochloric acid (HCl), phosphoric acid, perchloric acid, preferably hydrochloric acid to form acidified rice husk ash. In some embodiments, a concentration of the inorganic acid used for acid treating the rice husk ash ranges from 0.5 to 5 M, preferably 0.6 to 4 M, preferably 0.7 to 3 M, preferably 0.8 to 2 M, preferably 0.9 to 1.5 M, preferably 1 to 1.2 M. Suitable acid treatment may be accomplished by contacting the rice husk ash with the inorganic acid for a duration of 0.5 to 12 hours, preferably 1 to 8 hours, preferably 1.5 to 6 hours, preferably 2 to 4 hours. In preferred embodiments, the rice husk ash is soaked in the inorganic acid (e.g., 1 M hydrochloric acid) for the above duration to form acidified rice husk ash. The acidified rice husk ash may then be collected using any acceptable solid-liquid separation techniques, for example, filtration, decantation, etc., and optionally washed with water such as distilled water or doubly distilled water.

To complete the activation step, the acidified rice husk ash is then dried at a temperature and for a time sufficient to remove remaining moisture. Typically, the acidified rice husk ash is dried in an oven at 75 to 125° C., preferably 80 to 120° C., preferably 85 to 115° C., preferably 90 to 110° C., preferably 95 to 105° C., preferably 100° C., for 6 to 48 hours, preferably 12 to 36 hours, preferably 20 to 30 hours, preferably 24 to 26 hours to form dried acidified rice husk ash. As discussed above, it is believed that activation (acid treatment and drying) increases the number of surface exposed silanol (Si—OH) groups present on the rice husk ash surface which are capable of reacting with the amino silane.

The obtained dried acidified rice husk ash is then subject to amination with the amino silane (described earlier). Even though the reaction between the dried acidified rice husk ash and the amino silane involves a silanization reaction (reaction between the silanol surface of the dried acidified rice husk ash and the reactive silane group of the amino silane), it is nonetheless referred to herein as an "amination" reaction based on the functional groups which are installed, i.e., the end result is a rice husk ash having a surface decorated with amino functional organic groups.

Amination may be performed by mixing the dried acidified rice husk ash with the amino silane in a compatible organic solvent, preferably a nonpolar organic solvent such as pentane, hexane, cyclohexane, benzene toluene, chloroform, diethyl ether, and the like, preferably toluene, to form a reaction mixture. In some embodiments, a concentration of the dried acidified rice husk ash is from 0.05 to 0.5 g, preferably 0.06 to 0.4 g, preferably 0.07 to 0.3 g, preferably 0.08 to 0.2 g, preferably 0.09 to 0.15 g, preferably 0.1 to 0.12 g, per 1 ml of organic solvent (e.g., toluene). In some embodiments, the amination is carried out using 2 to 8 mmol of the amino silane, preferably 2.5 to 7 mmol, preferably 3 to 6 mmol, preferably 3.5 to 5.5 mmol, preferably 4 to 5 mmol of the amino silane, per g of the dried acidified rice husk ash. The reaction time and temperature may be varied depending on the reactivity of the reactive silane group of the amino silane, the reactant concentration, etc., however, the dried acidified rice husk ash is typically aminated at 100 to 140° C., preferably 105 to 135° C., preferably 110 to 130° C., preferably 115 to 125° C., preferably 120° C., and for 12 to 48 hours, preferably 16 to 36 hours, preferably 20 to 30 hours, preferably 24 to 26 hours. The resulting solid product may then be collected from the reaction mixture using solid-liquid separation techniques (e.g., filtration, evaporation, etc.), optionally washed with water, and dried for example in an oven at 75 to 125° C., preferably 80 to 120° C., preferably 85 to 115° C., preferably 90 to 110° C., preferably 95 to 105° C., preferably 100° C., for 1 to 24 hours, preferably 5 to 20 hours, preferably 10 to 16 hours, preferably 12 to 14 hours to form the aminated siliceous adsorbent.

$CO_2$ Capture and Hydrogen Storage Methods

The present disclosure also provides a method of capturing $CO_2$ from a gas mixture with the aminated siliceous adsorbent disclosed herein. The methods herein can be used for the capture of $CO_2$ from large point sources, such as large fossil fuel or biomass electricity power plants, biogas upgrading facilities, industries with major $CO_2$ emissions, natural gas processing, synthetic fuel plants, and fossil fuel-based hydrogen production plants. Capture from the open atmosphere is also possible. Therefore, the aminated siliceous adsorbent may be useful in $CO_2$ removal/capture from various gas mixtures that contain carbon dioxide ($CO_2$) and at least one other gas. The other gas may include, but is not limited to, nitrogen, hydrogen, oxygen, water (vapor), carbon monoxide, hydrocarbons having 1-4 carbon atoms (e.g. methane, ethane, ethylene, acetylene, propane, propylene, butane, iso-butane), nitrogen oxides (i.e. nitric oxide, nitrous oxide, nitrogen dioxide), and noble gases (e.g. helium, neon, argon, krypton, xenon), including mixtures thereof. In preferred embodiments, the other gas is one or more of hydrogen, oxygen, nitrogen, methane, and carbon monoxide, more preferably one or more of nitrogen and methane.

The aminated siliceous adsorbent of the present disclosure may be well-suited for applications where fossil fuels or other energy sources are burned for electricity. For example, the gas mixture may be a pre-combustion gas mixture, that is, a gas mixture produced from a fuel source prior to combustion taking place. Pre-combustion processing is typically used in the production of fertilizer, chemical gaseous fuel ($H_2$, $CH_4$), cement processing, and power production facilities (e.g., biomass power plant), and the like.

For example, in gasification processes a feedstock (such as coal) is partially oxidized in steam and oxygen/air under high temperature and pressure, for instance in a gasifier, to form synthesis gas. This synthesis gas, or syngas, is a mixture of hydrogen, carbon dioxide ($CO_2$) and smaller amounts of other gaseous components, such as methane. Syngas is an important intermediate for production of hydrogen, ammonia, methanol, and synthetic hydrocarbon fuels, and can be produced from many sources, including natural gas, coal, biomass, or virtually any hydrocarbon feedstock, by reaction with steam (steam reforming), carbon dioxide (dry reforming), or oxygen (partial oxidation). For example, syngas can be subject to the water-gas shift reaction to convert CO and water to $H_2$ and $CO_2$, producing a $H_2$ and $CO_2$-rich gas mixture. The $CO_2$ can then be captured and separated, transported, and ultimately sequestered or processed, and the $H_2$-rich fuel combusted. Syngas is also used as an intermediate in producing synthetic petroleum for use as a fuel or lubricant via the Fischer-Tropsch process and previously the Mobil methanol to gasoline process.

In another example, the pre-combustion gas mixture may be a biogas (mostly $CH_4$, $CO_2$, and in some cases $N_2$), and the method of the present disclosure may be applied to biogas upgrading. Here, the biogas is subject to a cleaning process using the aminated siliceous adsorbent whereby the carbon dioxide and any water, nitrogen, hydrogen sulfide, and particulates are removed, if present, to produce biomethane with acceptable pipeline purity for distribution networks to be used as fuel (combusted).

In preferred embodiments, the method is applied to remove/capture $CO_2$ from a pre-combustion gas mixture (e.g., a biogas), for example a pre-combustion gas mixture having a $CO_2$ concentration of 15 to 50 vol. %, preferably 20 to 45 vol. %, preferably 25 to 40 vol. %, preferably 30 to 35 vol. %, based on a total volume of the (pre-combustion) gas mixture.

Alternatively, the gas mixture may be a post-combustion gas mixture, i.e., a gas mixture produced after combustion of a fossil fuel, for example the gas mixture may be an exhaust (flue) gas from a power station or other large point source. In some embodiments, the method is applied to remove/capture $CO_2$ from a post-combustion gas mixture, for example a post-combustion gas mixture having a $CO_2$ concentration of 5 to 15 vol. %, preferably 6 to 14 vol. %, preferably 7 to 13 vol. %, preferably 8 to 12 vol. %, preferably 9 to 11 vol. %, preferably 10 vol. %, based on a total volume of the (post-combustion) gas mixture. Additionally, the post-combustion gas mixture may also include 70 to 75 vol. %, preferably 71 to 74 vol. %, preferably 72 to 73 vol. % of $N_2$ and 5 to 7 vol. %, preferably 5.5 to 6.5 vol. %, preferably 6 vol. % $H_2O$, each based a total volume of the (post-combustion) gas mixture. In preferred embodiments, the $CO_2$-capturing methods herein are performed post-combustion, i.e., the gas mixture is a post-combustion gas mixture, for example, a flue gas.

The $CO_2$ capture/removal methods of the present disclosure may be performed by contacting the gas mixture with the aminated siliceous adsorbent disclosed herein to adsorb at least a portion of the $CO_2$ into/onto the aminated siliceous adsorbent, thereby forming a loaded aminated siliceous adsorbent and a gas stream depleted in $CO_2$ compared to the gas mixture.

Adsorption technologies may be employed herein for $CO_2$ capture, for example, the $CO_2$ may be adsorbed by the aminated siliceous adsorbent via a physisorption process, meaning the process is primarily physical and preferably no permanent chemical changes occur on the aminated siliceous adsorbent or to the $CO_2$ molecules. If chemical changes do occur, such changes are transient and reversible so that desorption may be achieved to form intact $CO_2$ molecules. As such, the aminated siliceous adsorbent may be freestanding or supported on or within a substrate, for example, the aminated siliceous adsorbent may be housed within a chamber, for example, a column, plug, or filter, and/or on/within a substrate such as silica, alumina, and the like. Preferably, the aminated siliceous adsorbent may be supported within a fixed-bed column.

The chamber may be of any shape so long as the aminated siliceous adsorbent can be securely housed and utilized inside the chamber to accomplish the gas adsorption. The chamber may include an inlet configured to accept a feed stream (gas mixture), a gas stream outlet configured to expel a permeate (a gas stream depleted in $CO_2$), and optionally a retentate outlet configured to expel a retentate (a $CO_2$ rich stream). The chamber can be configured to be pressurized so as to force the gas mixture though the inlet and through a bed of the aminated siliceous adsorbent (and optionally a support) to enable infusion of $CO_2$ present in the gas mixture into the pore spaces of the aminated siliceous adsorbent, thereby forming the loaded aminated siliceous adsorbent. The chamber may also be connected to a vacuum pump to provide vacuum or a reduced pressure to the gas stream outlet for a similar purpose.

Membrane gas separation technologies may also be employed herein for $CO_2$ capture, for example, the aminated siliceous adsorbent may be utilized in a mixed matrix membrane by homogeneously interpenetrating the aminated siliceous adsorbent of the present disclosure within a polymer matrix, along with other optional filler materials. In such cases, the aminated siliceous adsorbent may be present in an amount of 0.1 to 50 wt. %, preferably 0.5 to 40 wt. %, preferably 1 to 30 wt. %, preferably 2 to 20 wt. %, preferably 3 to 15 wt. %, preferably 4 to 10 wt. %, preferably about 5 wt. %, relative to a total weight of the membrane.

The membrane may be a thin film membrane (e.g., a thickness of 10 to 2,000 μm), a flat sheet membrane, a spiral membrane, a tubular membrane, or a hollow fiber membrane. The membrane may be in the form of various shapes, for example, flat (e.g., for a disc-shaped membrane), bent, curved (e.g., a cylinder shaped membrane), and rippled. The membrane may have a porous morphology. For example, the membrane may contain unconnected pores each representing an isolated cavity having an unbroken pore wall, with the pores extending through the membrane without intersecting one another (e.g., monolithic membrane). Alternatively, the membrane may contain pores which are part of an interconnected network of pores where the pores in the membrane are randomly oriented and intersect. The membrane may contain micropores (an average diameter of less than 2 nm), mesopores (an average diameter of 2-50 nm), macropores (an average diameter larger than 50 nm), or a mixture thereof. For example, the membrane may be macroporous, having pores with an average diameter in a range of 0.5 to 10 μm, preferably 1 to 8 μm, preferably 1.5 to 6 μm, preferably 2 to 5 μm, preferably 3 to 4 μm.

The polymer matrix preferably has a high glass transition temperature ($T_g$), high melting point, and high crystallinity, i.e., the polymer is preferably a rigid, glassy polymer. In some embodiments, the polymer (of the polymer matrix) has a weight average molecular weight ($M_w$) of $1\times10^4$ to $2\times10^7$ g/mol, preferably $5\times10^4$ to $1.5\times10^7$ g/mol, preferably $1\times10^5$ to $1\times10^7$ g/mol.

Exemplary polymers that may be used to construct the polymer matrix in the disclosed mixed matrix membranes include, but are not limited to:

polyolefins such as polyethylene, polypropylene, poly-butene-1, and poly(4-methyl pentene-1), including polyvinyls and fluoropolymer variants thereof, for example polyvinylidene fluoride (PVDF), polytetrafluoroethylene (PTFE), polyvinyl chloride, polyvinyl fluoride, polyvinylidene chloride, polyvinylidene fluoride, polyvinyl alcohol, polyvinyl ester (e.g., polyvinyl acetate and polyvinyl propionate), polyvinyl pyridine, polyvinyl pyrrolidone, polyvinyl ether, polyvinyl ketone, polyvinyl aldehyde (e.g., polyvinyl formal and polyvinyl butyral), polyvinyl amide, polyvinyl amine, polyvinyl urethane, polyvinyl urea, polyvinyl phosphate, and polyvinyl sulfate;

polystyrene (e.g., isotactic polystyrene and syndiotactic polystyrene), including styrene-containing copolymers such as acrylonitrilestyrene copolymers, styrene-butadiene copolymers and styrene-vinylbenzylhalide copolymers;

thermoplastic elastomers (TPE);

silicones such as polydimethylsiloxane (PDMS) and polymethylphenylsilicone (PMPS);

polyacetylenes such as polytrimethylsilylpropyne;

polysulfones including polyethersulfones (PESs) as well as sulfonated PESs, with specific mention being made to poly(1,4-phenylene ether-ether-sulfone), poly(1-hexadecene-sulfone), poly(1-tetradecene-sulfone), poly(oxy-1,4phenylenesulfonyl-1,4-phenylene), poly (oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), polyphenylsulfone, and ULTRASON S 6010 from BASF;

polysulfonamides such as poly[1-[4-(3-carboxy-hydroxyphenylazo)benzenesulfonamido]-1,2-ethanediyl]);

polyacetals;

polyethers;

polyethylenimines;

polycarbonates;

cellulosic polymers such as cellulose acetate, cellulose triacetate, cellulose acetate-butyrate, cellulose propionate, ethyl cellulose, methyl cellulose, and nitrocellulose;

polyamides including aromatic polyamides and aliphatic polyamides, such as Nylon 6 and polyphthalamide;

polyimides with specific mention being made to KAPTON (poly (4,4'-oxydiphenylene-pyromellitimide) by DuPont, MATRIMID by Huntsman Advanced Materials, P84 by HP Polymers GmbH, poly(3,3',4,4'-benzophenone tetracarboxylic dianhydride-pyromellitic dianhydride-3,3',5,5'-tetramethyl-4,4'-methylene dianiline) (or poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (or poly(BTDA-PMDA-ODPA-TMMDA)), poly(3,3',4,4'-diphenylsulfone tetracarboxylic dianhydride-3,3',5,5'-tetramethyl-4,4'-methylene dianiline) (or poly(DSDA-TMMDA)), poly(3,3',4,4'-benzophenone tetracarboxylic dianhydride-3,3',5,5'-tetramethyl-4,4'-methylene dianiline) (or poly(BTDA-TMMDA)), poly (3,3',4,4'-diphenylsulfone tetracarboxylic dianhydride-pyromellitic dianhydride-3,3',5,5'-tetramethyl-4,4'-methylene dianiline) (or poly(DSDA-PMDA-TMMDA)), and poly[2,2'-bis-(3,4-dicarboxyphenyl) hexafluoropropane dianhydride-2,2-bis(3-amino-4-hydroxyphenyl)-hexafluoropropane] (or poly(6FDA-APAF)), poly[2,2'-bis-(3,4-dicarboxyphenyl) hexafluoropropane dianhydride-2,4,6-trimethyl-1,3-phenylenediamine] (or poly(6FDA-DAM), poly[3,3',4,4'-benzophenonetetracarboxylic dianhydride-2,2-bis (3-amino-4-hydroxyphenyl)-hexafluoropropane] (or poly(BTDA-APAF)), poly(3,3',4,4'-benzophenonetetracarboxylic dianhydride-3,3'-dihydroxy-4,4'-diamino-biphenyl) (or poly(BTDA-HAB)), poly[4,4'-oxydiphthalic anhydride-2,2-bis(3-amino-4-hydroxyphenyl)-hexafluoropropane] (or poly(ODPA-APAF)), poly[3,3',4,4'-diphenylsulfone tetracarboxylic dianhydride-2,2-bis(3-amino-4-hydroxyphenyl)-hexafluoropropane] (or poly(DSDA-APAF)), poly(3,3',4,4'-diphenylsulfone tetracarboxylic dianhydride-3,3'-dihydroxy-4,4'-diamino-biphenyl) (or poly(DSDA-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (or poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (or poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (or poly(BTDA-APAF-HAB)), poly[2,2'-bis-(3,4-dicarboxyphenyl) hexafluoropropane dianhydride-3,3'-dihydroxy-4,4'-diamino-biphenyl] (or poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane) (or poly(BPADA-BTDA-APAF));

polyetherimides such as ULTEM products manufactured by Sabic Innovative Plastics;

polyamide imides;

polyketones;

polyether ketones such as polyether ether ketone, sulfonated polyether ether ketone and the like;

polyarylene oxides such as polyphenylene oxide, polyxylene oxide, sulfonated polyxylene oxide and brominated polyxylene oxide;

polyurethanes;

polyureas;

polyazomethines;

polyesters including polyarylates such as polyethylene terephthalate and polyphenylene terephthalate;

acrylates such as polyalkyl (meth)acrylate, polyacrylate, polyacrylate-polyacrylamide copolymers;

polysulfides;

heterocyclic thermoplastics such as polybenzimidazoles, polyoxadiazoles, polytriazoles, polybenzoxazole, and polybenzimidazole;

polycarbodiimides;

polyphosphazines;

polyhydrazides;

and copolymers thereof, including block copolymers, grafts, and blends thereof.

The mixed matrix membrane may be made by methods known to those of ordinary skill in the art, for example, by casting or melt blending, and the polymer matrix may be made porous by known techniques including, but not limited to, irradiation, stretching of a melt-processed semi-crystalline polymer substrate, vapor-induced phase separation, and temperature-induced phase separation, just to name a few.

When the aminated siliceous adsorbent of the present disclosure is utilized in mixed matrix membrane separation technologies, the membrane may be housed in chamber such that the membrane divides the chamber into a feed side and a permeate side. The gas mixture may then be fed into the feed side of the chamber so that at least a portion of the $CO_2$ present in the gas mixture permeates the membrane and is adsorbed by the aminated siliceous adsorbent, thereby forming the loaded aminated siliceous adsorbent. This may be accomplished for example by supplying the gas mixture at above atmospheric pressure or otherwise forcing at least a portion of the gas mixture through the membrane by pressurizing the feed side, or applying a vacuum to the permeate side of the chamber. A gas stream depleted in $CO_2$ compared to the gas mixture may then be collected from the permeate side, and the chamber may be optionally configured to include a retentate outlet to expel a retentate (a $CO_2$ rich stream) after desorbing $CO_2$ molecules from the loaded aminated siliceous adsorbent.

Regardless of whether an adsorptive technique (e.g., fixed-bed of the aminated siliceous adsorbent) or a membrane gas separation technology is utilized, the gas mixture is contacted with the aminated siliceous adsorbent disclosed herein. The gas mixture may be contacted with the aminated siliceous adsorbent in a single chamber, or the gas mixture may be passed through a series of chambers housing the aminated siliceous adsorbent to gradually/sequentially remove/capture $CO_2$ from the gas mixture. Similarly, the aminated siliceous adsorbent may be used in addition to other known adsorption materials to provide a gas stream depleted in $CO_2$ and a loaded aminated siliceous adsorbent.

In some embodiments, prior to contacting the gas mixture with the aminated siliceous adsorbent, the aminated siliceous adsorbent may be activated through a degassing procedure performed in a sub-atmospheric pressure of 0.05 to 0.8 atm, preferably 0.1 to 0.5 atm, preferably 0.2 to 0.4 atm to remove gas or solvent molecules that may reside in the pore spaces of the aminated siliceous adsorbent. The aminated siliceous adsorbent may be degassed at a temperature of 0 to 200° C., preferably 10 to 150° C., preferably 25 to 100° C., or about 80° C. for 1 to 48 hours, preferably 2 to 36 hours, preferably 8 to 24 hours, preferably 12 to 18 hours.

A force may be provided to deliver the gas mixture into contact with the aminated siliceous adsorbent. The gas mixture may be introduced at flow rate of 0.001 to 1,000 L/min, preferably 0.005 to 500 L/min, preferably 0.01 to 100 L/min, preferably 0.05 to 10 L/min, preferably 0.1 to 5 L/min, preferably 0.5 to 2 L/min. In some embodiments, the gas mixture is pressurized (e.g., be applying pressure to a feed side of a chamber) at a pressure of greater than 760 and up to 4,000 Torr, preferably 800 to 3,500 Torr, preferably 850 to 3,000 Torr, preferably 900 to 2,500 Torr, preferably 1,000 to 2,000 Torr to force at least a portion of the gas mixture to contact the aminated siliceous adsorbent. In some embodiments, the gas mixture is contacted with the aminated siliceous adsorbent under vacuum, for example by applying a reduced pressure of less than 760 Torr, preferably 10 to 750 Torr, preferably 20 to 700 Torr, preferably 30 to 600 Torr to the permeate side of a chamber such that at least a portion of the gas mixture is brought into contact with the aminated siliceous adsorbent. In preferred embodiments, the gas mixture is contacted with the aminated siliceous adsorbent under vacuum at a reduced pressure of 60 to 160 Torr, preferably 70 to 150 Torr, preferably 80 to 140 Torr, preferably 90 to 130 Torr, preferably 100 to 120 Torr. Alternatively, the gas mixture may stay stagnant over the aminated siliceous adsorbent (i.e. as an atmosphere to the aminated siliceous adsorbent) for a suitable amount of time to enable adsorption of $CO_2$.

The gas mixture may be contacted with the aminated siliceous adsorbent at any temperature that enables desired levels of $CO_2$ capture, for example, the gas mixture may have a temperature of −5 to 80° C., preferably 0 to 75° C., preferably 5 to 60° C., preferably 10 to 50° C., preferably 20 to 35° C., preferably 25 to 30° C.

A gas stream depleted in $CO_2$ may be obtained after at least a portion of $CO_2$ is adsorbed onto the aminated siliceous adsorbent. A composition of the gas stream depleted in $CO_2$ may vary depending on the composition of the gas mixture. In some embodiments, the gas stream depleted in $CO_2$ contains at least 25% less $CO_2$, preferably at least 30% less $CO_2$, preferably at least 40% less $CO_2$, preferably at least 50% less $CO_2$, preferably at least 60% less $CO_2$, preferably at least 70% less $CO_2$, preferably at least 80% less $CO_2$, preferably at least 90% less $CO_2$, preferably at least 95% less $CO_2$, by volume compared to a volume of $CO_2$ present in the gas mixture. For example, when the methods herein are employed in pre-combustion processes, the gas stream depleted in $CO_2$ may contain less than 35 vol % $CO_2$, preferably less than 25 vol % $CO_2$, preferably less than 20 vol % $CO_2$, preferably less than 15 vol % $CO_2$, preferably less than 10 vol % $CO_2$, preferably less than 5 vol % $CO_2$, preferably less than 1 vol % $CO_2$, preferably less than 0.5 vol % $CO_2$, preferably less than 0.1 vol % $CO_2$, based on a total volume of gas stream depleted in $CO_2$. When the methods herein are employed in post-combustion processes, the gas stream depleted in $CO_2$ may contain less than 10 vol % $CO_2$, preferably less than 8 vol % $CO_2$, preferably less than 6 vol % $CO_2$, preferably less than 4 vol % $CO_2$, preferably less than 2 vol % $CO_2$, preferably less than 1 vol % $CO_2$, preferably less than 0.5 vol % $CO_2$, preferably less than 0.1 vol % $CO_2$, preferably less than 0.05 vol % $CO_2$, preferably less than 0.01 vol % $CO_2$, based on a total volume of gas stream depleted in $CO_2$.

In some embodiments, the method of the present disclosure further involves desorbing the $CO_2$ from the loaded aminated siliceous adsorbent, and reusing the aminated siliceous adsorbent. The carbon dioxide may be stripped off the aminated siliceous adsorbent using temperature swing adsorption (TSA) or pressure swing adsorption (PSA) techniques so the aminated siliceous adsorbent can be reused. For instance, desorbing the $CO_2$ may involve heating the loaded aminated siliceous adsorbent at a temperature of 50 to 200° C., preferably 60 to 180° C., preferably 70 to 160° C., preferably 80 to 140° C., preferably 90 to 120° C., preferably 100 to 110° C., subjecting the loaded aminated siliceous adsorbent to a reduced pressure of less than 750 Torr, preferably less than 700 Torr, preferably less than 600 Torr, preferably less than 500 Torr, preferably less than 400 Torr, preferably less than 300 Torr, preferably less than 200 Torr, preferably less than 100 Torr, preferably less than 75 Torr, preferably less than 50 Torr, preferably less than 25 Torr, or a combination of heat and reduced pressure.

The loaded aminated siliceous adsorbent may be regenerated (i.e. desorbed) and reused without a significant loss in $CO_2$ uptake capacity. For instance, the aminated siliceous adsorbent may be used to capture $CO_2$, desorbed, and reused for up to 25 cycles, preferably up to 20 cycles, preferably up to 15 cycles, preferably up to 10 cycles, preferably up to 5 cycles, and the $CO_2$ uptake capacity may be reduced by no more than 10%, preferably no more than 8%, preferably no more than 6%, preferably no more than 4%, preferably no more than 3%, preferably no more than 2%, preferably no more than 1%, relative to an initial $CO_2$ uptake capacity of the aminated siliceous adsorbent.

Desorbing the $CO_2$ from the loaded aminated siliceous adsorbent generates a gas stream enriched in $CO_2$. Such a gas stream may be optionally subjected to further processing steps such as an additional purification step (e.g. column chromatography, further membrane separation steps, etc.), and any captured and collected $CO_2$ may optionally be subject to numerous processing steps, for example, used for the production of urea, methanol, metal carbonates and bicarbonates, aromatic and aliphatic polycarbonates, and sodium salicylate, as well as used in biotransformations to form fuels such as isobutyraldehyde and isobutanol, as is known to those of ordinary skill in the art.

In addition to pre-combustion and/or post-combustion $CO_2$ capture applications, it is contemplated that the aminated siliceous adsorbents disclosed herein may be used in air purifiers, chemical filters, oil and gas refineries, fermenters, bioreactors, or in any other process where the capture/removal of $CO_2$ is desired. Furthermore, owing to its functional hydrogen uptake capacity, specifically at low temperature, the aminated siliceous adsorbents disclosed herein may be used in hydrogen storage applications, such as in cryogenic adsorption vessels/systems as the adsorbent medium such as described in U.S. Pat. Nos. 3,839,847A and 8,454,730B2—each incorporated herein by reference in its entirety, for example, for vehicle fuel applications.

In preferred embodiments, the methods herein rely on the adsorbent properties of the aminated siliceous adsorbent, and no other ashed/comminuted plant materials or agricultural products, such as those listed previously, or other sieving material (e.g., hierarchical mesoporous silicates and aluminosilicates, carbonaceous materials, and molecular organic frameworks), such as those listed previously, are utilized for $CO_2$ and/or $H_2$ capture.

The examples below are intended to further illustrate protocols for preparing the aminated siliceous adsorbents and for using the aminated siliceous adsorbents in $CO_2$ capture applications, and are not intended to limit the scope of the claims.

Where a numerical limit or range is stated herein, the endpoints are included. Also, all values and subranges within a numerical limit or range are specifically included as if explicitly written out.

The terms "comprise(s)", "include(s)", "having", "has", "contain(s)", and variants thereof, as used herein, are intended to be open-ended transitional phrases, terms, or words that do not preclude the possibility of additional acts or structures. The present disclosure also contemplates other embodiments "comprising", "consisting of" and "consisting essentially of", the embodiments or elements presented herein, whether explicitly set forth or not.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Experimental
Chemicals and Materials
Rice husk (RH) materials were gained as a by-product of rice and right away employed as the initiating material without any pretreatment. Sulfuric acid ($H_2SO_4$, 95%) was purchased from Cromoline for washing and cleaning of RH. Rice husk ash (RHA) was extracted from RH by heating treatment. Hydrochloric acid (37%) for acidification of RHA and anhydrous toluene (99.8%) as a solvent were bought from Sigma-Aldrich (St. Louis, USA). (3-aminopropyl) triethoxysilane was bought from Sigma-Aldrich (St. Louis, USA) to provide the aminated siliceous adsorbent, also referred to as aminated silica ($ASiO_2$).

Preparation of Rice Husk Ash (RHA):

The rice husk was washed with double distilled water (DDW) and 1M sulfuric acid to remove all impurities, then dried in the oven overnight at 100° C. After that, the dried clean RH was ashed in the furnace at 700° C. for 6 hr.

Preparation of Aminated Siliceous Adsorbent ($ASiO_2$):

Firstly, RHA was soaked with 1 M HCl for 2 h, then washed with double distilled water, finally, dried in the oven at 100° C. overnight. 5 g of the acidified silica was added in 50 mL of dry toluene with 5 mL of 3-APTES and stirring for 24 h at 120° C. The resultant product was washed with DDW and dried overnight in the oven at 100° C. See X. Hou et al., "Preparation and application of guanidyl-functionalized graphene oxide-grafted silica for efficient extraction of acidic herbicides by Box-Behnken design," *J. Chromatogr. A*, vol. 1571, pp. 65-75, 2018., incorporated herein by reference in its entirety. The prepared aminated siliceous adsorbent was called "$ASiO_2$".

Material Characterization

1. Surface Morphology

Scanning electron microscopy (SEM) (Lyra3 TESCAN) was performed to investigate the surface of the RHA and $ASiO_2$ materials. Energy-dispersive X-ray spectroscopy (EDX) scan was performed to investigate the existence of the functional groups on the surface of prepared materials, also done. X-ray photoelectron spectroscopy (V.G. Scientific ESCALAB Mk (II) spectrometer using a non-monochromatic Al source (Kα, 1486.6 eV) was used to confirm the existence of elements on the sorbent surface.

2. BET Surface Area

For the Brunauer-Emmett-Teller (BET) surface area measurements, 0.1 g of the sample was loaded in a BET quartz tube at 200° C. for two hours in vacuum. Nitrogen adsorption isotherms were obtained by Quantachrome Autosorb iQ-MP-C-XR. To measure the surface area and average pore size of RHA and $ASiO_2$, BET equation and DFT method was used respectively. See P. I. Ravikovitch, G. L. Haller, and A. V. Neimark, "Density functional theory model for calculating pore size distributions: pore structure of nanoporous catalysts," *Adv. Colloid Interface Sci.*, vol. 76-77, pp. 203-226, July 1998; and C. Lastoskie, K. E. Gubbins, and N. Quirkeft$, "Pore Size Distribution Analysis of Microporous Carbons: A Density Functional Theory Approach," *J. Phys. Chem*, vol. 97, 1993, each incorporated herein by reference in their entirety.

3. Fourier Transform Infrared Spectroscopy (FTIR)

The FTIR spectra were acquired by employing a Nicolet 6700 FT-IR (Thermo Electron Corporation). Potassium bromide was utilized to prepare a sample pellet, and the spectra were achieved in the range of 4000-400 cm$^{-1}$ with a resolution of 4 cm$^{-1}$ by the assemblage of 32 scans.

4. X-Ray Diffraction (XRD)

In order to get XRD pattern of RHA and $ASiO_2$ adsorbent were acquired by Rigaku Miniflex II desktop X-ray diffractometer (tube output voltage 30 kV) at a scan rate of 2.5° min$^{-1}$ from 3 to 100°.

5. Thermal Gravimetric Analysis (TGA)

Thermal stability was investigated using (SDT Q 600, TGA Instruments, New Castle, Del.) by calcination the adsorbent under the flow of nitrogen (75 ml/min) up to 1000° C. with a heating rate of 10° C./min. The weight loss of adsorbent was recorded and followed to measure the thermal stability of the RHA and $ASiO_2$.

Gas Adsorption

The $CO_2$, $H_2$, $CH_4$ and $N_2$ gases were adsorbed by RHA and $ASiO_2$ using Quantachrome Autosorb iQ-MP-C-XR. The experimental procedure of adsorption as following: initially, about 30-100 mg of each sample was loaded for evacuation to remove all moisture and gases up to 200° C. under an $N_2$ and He atmosphere for 3.5 h. Then, the sample is loaded for adsorption of different gases and different temperature under high-pressure condition isothermally. Once the adsorption is finished the system is switch to very low pressure for desorption of adsorbed gas. At this stage, one adsorption-desorption circle was performed. To investigate the reversibility of the adsorbent, three adsorption-desorption cycles had been done. See Zhang et al.; Yi et al.; S. H. Moon and J. W. Shim, "A novel process for CO2/CH4 gas separation on activated carbon fibers-electric swing adsorption," *J. Colloid Interface Sci.*, vol. 298, no. 2, pp. 523-528, 2006, incorporated herein by reference in its entirety.

Computational Methods

Geometry optimization and vibrational frequency calculations were carried out on simplified lowest energy isomer of silica cluster, $Si_4O_6$, APTES and APTES functionalized silica using density functional theory (DFT) approach, with the exchange-correlation treated using the hybrid GGA exchange functional of Becke and the PW91 correlation functional of Perdew and Wang, BPW91 and 6-31G basis set. See W. C. Lu, C. Z. Wang, V. Nguyen, M. W. Schmidt, M. S. Gordon, and K. M. Ho, "Structures and Fragmentations of Small Silicon Oxide Clusters by ab Initio Calculations," *J. Phys. Chem. A*, vol. 107, no. 36, pp. 6936-6943, September 2003; A. D. Becke, "Density-functional thermochemistry. III. The role of exact exchange," *J. Chem. Phys.*, vol. 98, no. 7, pp. 5648-5652, April 1993; and J. P. Perdew and Y. Wang, "Accurate and simple analytic representation of the electron-gas correlation energy," *Phys. Rev. B*, vol. 45, no. 23, pp. 13244-13249, June 1992, each incorporated herein by reference in their entirety. Full structural optimizations were carried out to the minima, and vibrational frequency analysis showed the absence of imaginary frequencies. Total energies of the natural bonding orbitals of the adsorbents, bond properties and their relative binding distances with the gases were computed. Variations in temperature adsorption studies were carried out using temperature command in the input files prior to running the calculations. Adsorption energies ($\Delta E_{ads}$) of the gases on the adsorbents were estimated using the eqs:

$$\Delta E_{ads} = -\Delta E_{binding}$$

$$\Delta E_{binding} = E_{ads/gas} - (E_{ads} + E_{gas})$$

Where $E_{ads/gas}$ represents the free energy of the adsorbent-gases complex and $E_{ads}$, $E_{gas}$ the free energies of the isolated adsorbents and the gases, respectively. All calculations were carried out using the Gaussian 09 program.

Results and Discussion

Surface Morphology

The SEM-EDX monographs of RHA and $ASiO_2$ are shown in FIG. 1. There is no significant difference in the morphology of the surface before (FIG. 1A) and after functionalization of RHA with 3-APTES (FIG. 1B). The surface of $ASiO_2$ became darker due to the presence of the amine group on the surface. See T. Sakpal, A. Kumar, S. Kamble, and R. Kumar, "Carbon dioxide capture using amine functionalized silica gel," *Indian J. Chem.*, vol. 51, pp. 1214-1222, 2012, incorporated herein by reference in its entirety. The EDX analysis of RHA (FIG. 1C) shows a significant content of oxygen and silicon of 43.2% and 37.2%, respectively. On the other hand, the functionalization of RHA with 3-APTES was confirmed by EDX analysis (FIG. 1D) and showed a content of C, O, Si and N of 27.4%, 38.3%, 31.1%, and 3.2%; respectively.

X-ray photoelectron spectroscopy (XPS), comprehensive scan of RHA, shows the presence of oxygen and silicon on the surface, which confirms the successful preparation of $SiO_2$ from rice husk. The high-resolution scans reveal the chemical state and types of bonding present in the elements. A band was noticed in the high-resolution scan of (O1s) at −533.3 eV that can be accredited to the Si—O bond of silica. See M. Li, L. Zhuang, X. Wang, H. Shen, L. Zeng, and Y. Chen, "Realization of Colored Multicrystalline Silicon Solar Cells with SiO 2/SiN x:H Double Layer Antireflection Coatings," *Int. J. Photoenergy*, vol. 2013, pp. 1-8, 2013, incorporated herein by reference in its entirety. The data also demonstrates the high-resolution XPS band of Si (2p). The deconvoluted binding energy peaks at ~103 and 104 eV can be ascribed to the Si—O bonds with different oxidation state ($Si^{4+}$) and ($Si^{3+}$) while the peak at ~102 can be attributed to Si—Si bond with oxidation stat of ($Si^{2+}$). See Li et al.; R. Ghita et al., "Study of SiO2/Si Interface by Surface Techniques, Crystalline Silicon—Properties and Uses," InTech, 2011, pp. 23-42; and M. Choi, J.-C. Kim, and D.-W. Kim, "Waste Windshield-Derived Silicon/Carbon Nanocomposites as High-Performance Lithium-Ion Battery Anodes," *Sci. Rep.*, vol. 8, no. 1, p. 960, December 2018, each incorporated herein by reference in their entirety.

Figure 2A:
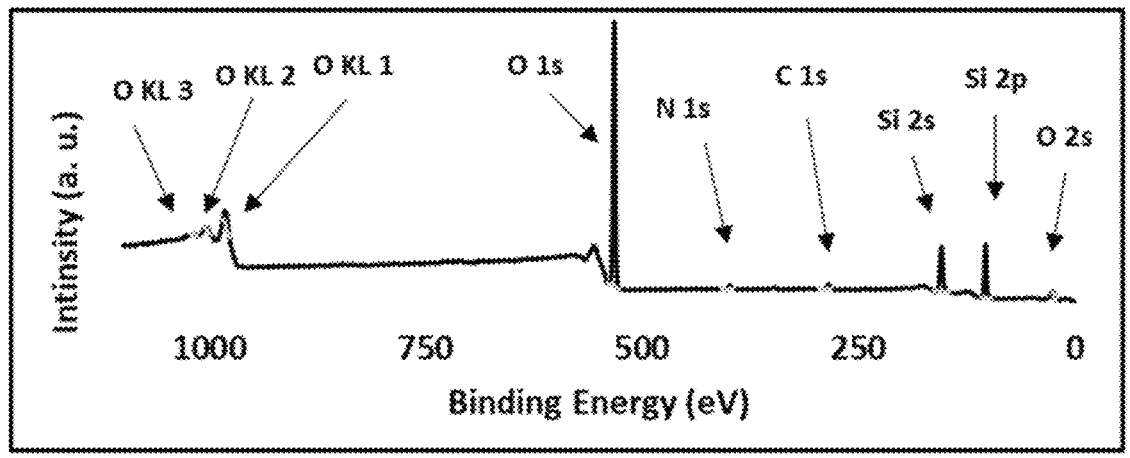
FIGS. 2A-2E illustrate the XPS analysis of ASiO₂, showing a wide scan spectrum (FIG. 2A) and high resolution spectrum of O(1s) (FIG. 2B), C(1s) (FIG. 2C), N(1s) (FIG. 2D), and Si(2p) (FIG. 2E)
Figure 2B:
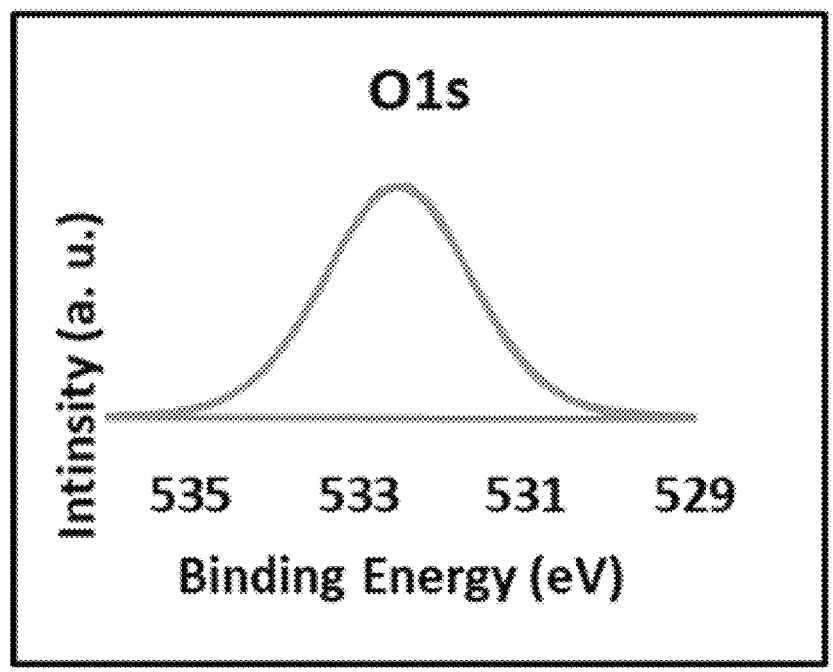
Figure 2C:
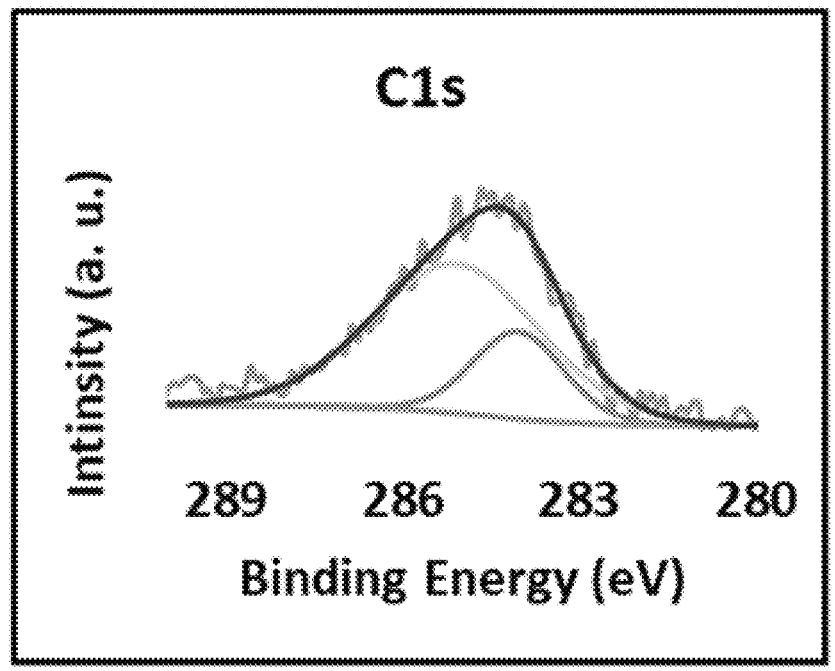
Figure 2D:
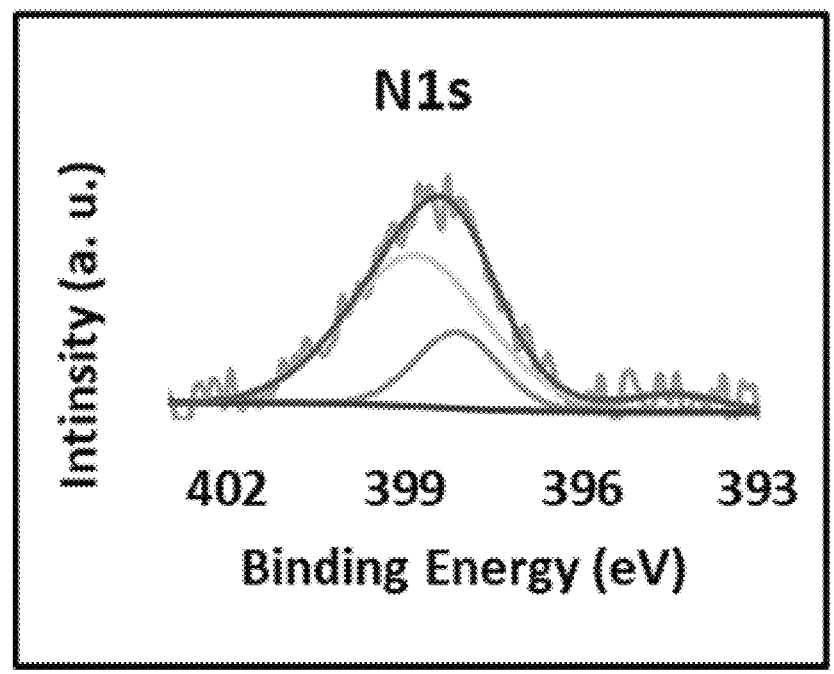
Figure 2E:
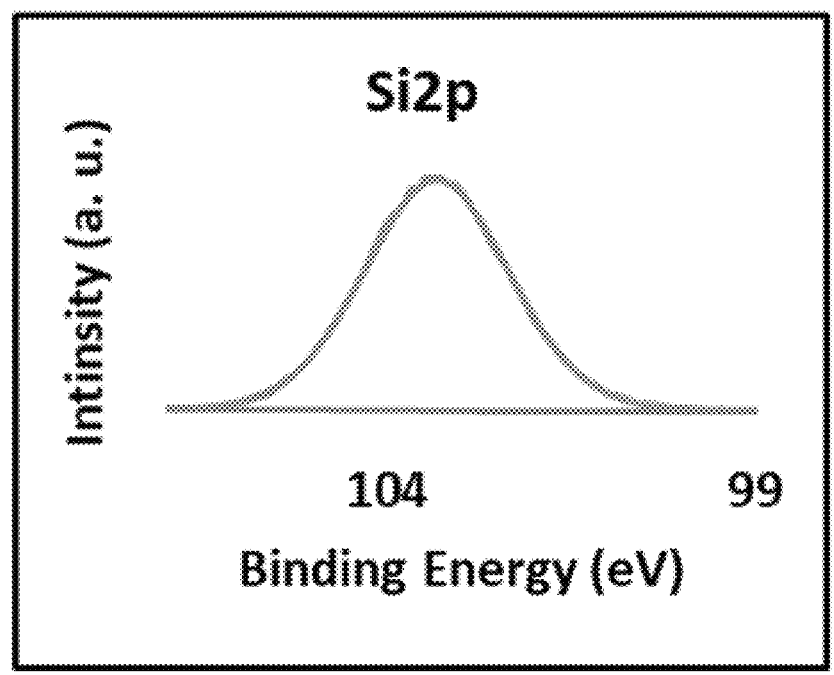

The XPS full scan of $ASiO_2$ (FIG. 2A) demonstrates prominent elemental variation in the structure, which confirm the treatment of RHA with 3-APTES to functionalized silica with an amine group. This data showed the introduction of nitrogen and carbon into the structure. This result is compatible with and EDX data, but XPS analysis is a more accurate and sensitive technique. The high-resolution carbon spectra (FIG. 2C) showed the peak at ~284 eV and ~285 eV that can be allocated to C—C and C—N or C—O bond; respectively. See D. B. Knorr et al., "Use of 3-aminopropyltriethoxysilane deposited from aqueous solution for surface modification of III-V materials,"*Appl. Surf. Sci.*, vol. 320, pp. 414-428, 2014, incorporated herein by reference in its entirety. In the case of N (1s) spectra (FIG. 2D), the peak at ~398 eV corresponds to $NH_2$ while the peak at ~399 eV corresponds to $NH_3^+$. See J. H. Lee et al., "Investigation of the mechanism of chromium removal in (3-aminopropyl) trimethoxysilane functionalized mesoporous silica," *Sci. Rep.*, vol. 8, p. 12078, 2018, incorporated herein by reference in its entirety. FIG. 2B showed the high-resolution scan of O (1s) with major peak and binding energy at ~532.5, which is related to ethoxy group bond O—C. See Knorr et al. The data in (FIG. 2E) demonstrates the high-resolution XPS band of Si (2p). The deconvoluted binding energy peaks at ~103.3 eV can be ascribed to the Si—O bond. See M. Li, L. Zhuang, X. Wang, H. Shen, L. Zeng, and Y. Chen, "Realization of Colored Multicrystalline Silicon Solar Cells with SiO 2/SiN x:H Double Layer Antireflection Coatings," *Int. J. Photoenergy*, vol. 2013, pp. 1-8, 2013, incorporated herein by reference in its entirety.

Pore Size Distribution Measurements

Figure 3A:
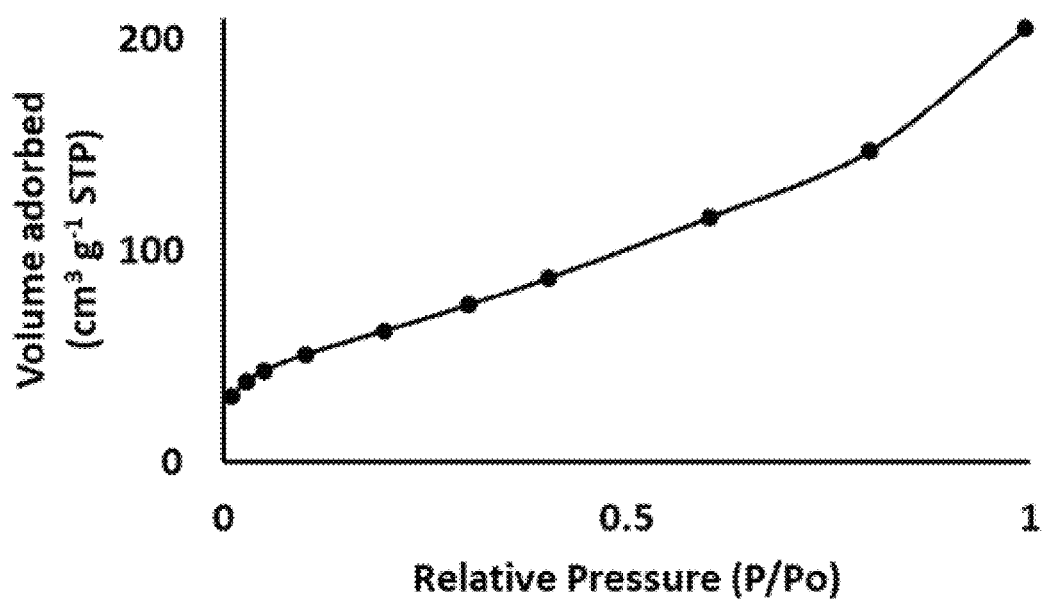
FIGS. 3A-3D illustrate the $N_2$ adsorption isotherm (FIG. 3A) and pore size distribution (FIG. 3B) of RHA and $N_2$ adsorption isotherm (FIG. 3C) and pore size distribution (FIG. 3D) of $ASiO_2$.

Nitrogen adsorption was utilized to measure the surface area and demonstrate the pore features of the produced materials. FIGS. 3A and 3C shows the $N_2$ adsorption isotherm of RHA and $ASiO_2$, respectively, at 77 K.

The adsorbed volume of nitrogen on RHA uninterruptedly up surged but did not attain a plateau close to the relative pressure ($P/P_o$) of 1.0, inferring the existence of mesopores. In the case of $ASiO_2$, the adsorption capability is lower at low pressure as compared to RHA confirming the loading of the amino group on the surface. The surface area, pore diameter, and pore volume of RHA and $ASiO_2$ are shown in Table 1.

TABLE 1

Structural properties of RHA and $ASiO_2$

| Sample | $S_{BET}$ (m$^2$/g) | $V_p$ (cm$^3$/g) | $D_p$ (nm) |
|---|---|---|---|
| RHA | 222.9 | 0.248 | 3.385 |
| $ASiO_2$ | 100.9 | 0.179 | 3.099 |

Figure 3B:
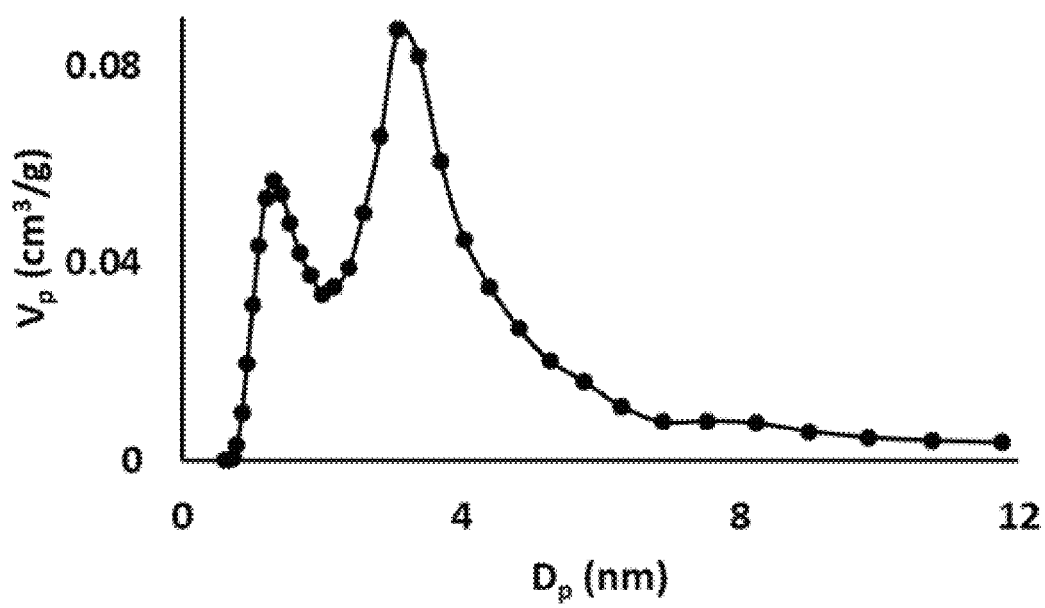
Figure 3C:
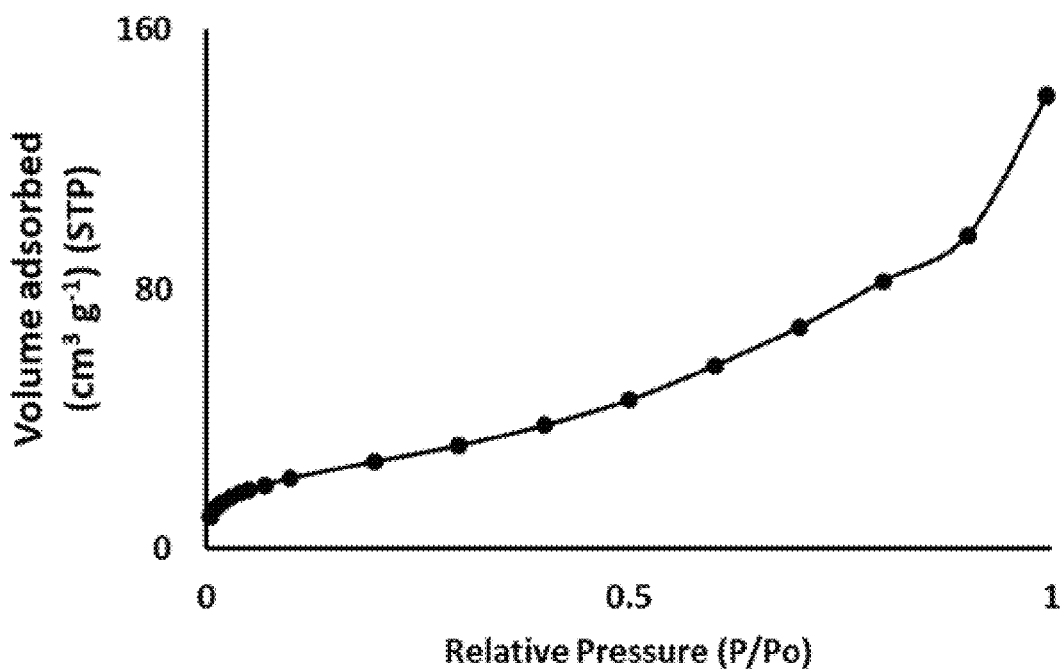
Figure 3D:
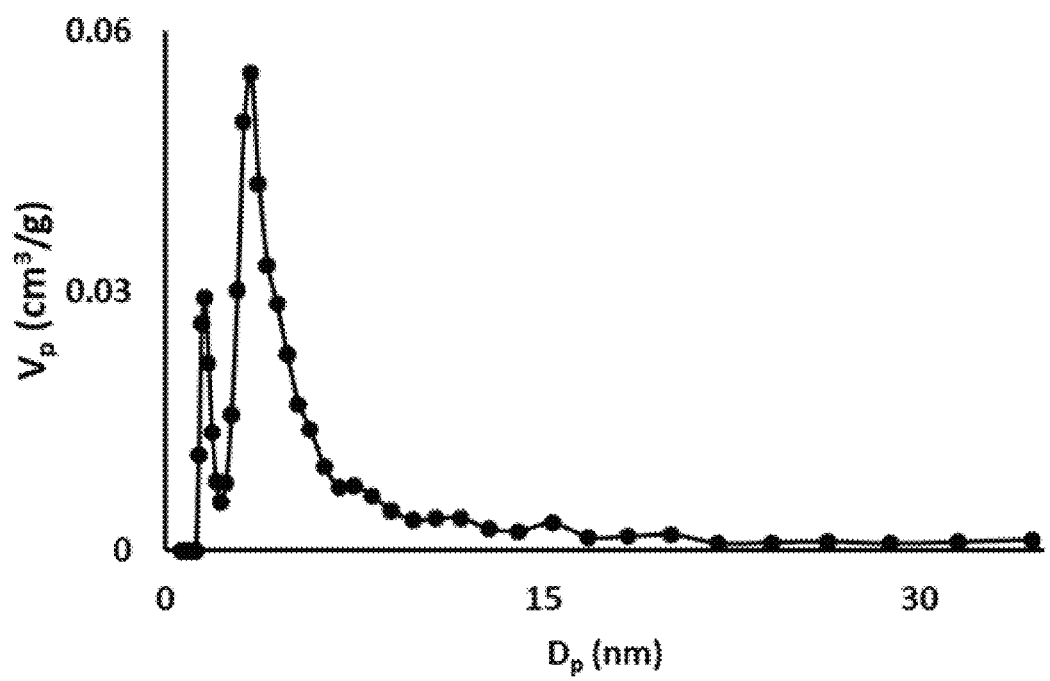

The pore size distribution of RHA is from 3.3 nm to 12 nm with a pore volume of 0.25 cm$^3$/g, g, confirming the presence of mesopores in RHA (FIG. 3B). However, the porous structure of $ASiO_2$ (FIG. 3D) mainly had mesopores distributed up to 12 nm with a mean diameter of 3.0 nm and a pore volume of 0.18 cm$^3$/g. The decrease in pore size and pore volume of $ASiO_2$ is mainly due to pore filling with APTES. See T. Sakpal, A. Kumar, S. Kamble, and R. Kumar, "Carbon dioxide capture using amine functionalized silica gel," *Indian J. Chem.*, vol. 51, pp. 1214-1222, 2012, incorporated herein by reference in its entirety.

Thermal Gravimetric Analysis

Figure 4:
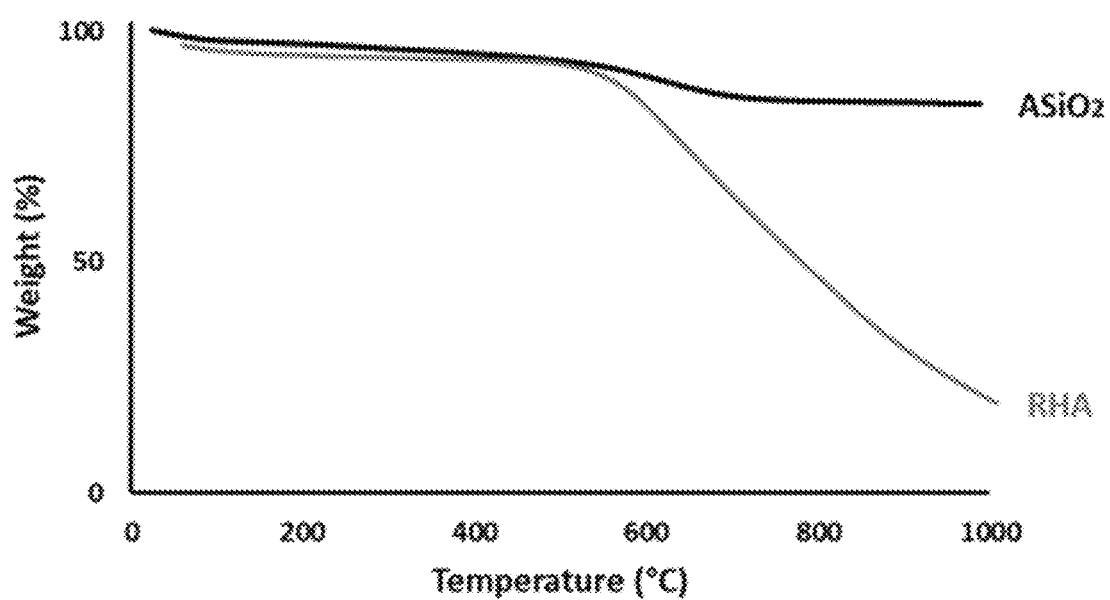
FIG. 4 is a graph illustrating the TGA analysis of RHA and $ASiO_2$.

The thermal stability of the silica-based materials were investigated with TGA analysis (FIG. 4). When the temperature reached 1000° C., 5% of RHA and 85% of the $ASiO_2$ materials remained as a residual solid. The analysis shows that there are three zones in the TGA curves of each adsorbent. In the case of amine-modified silica, the adsorbent shows a lower rate of weight loss in the range of 50-600° C. due to the removal of guest molecules and moisture. Further, an increase in temperature up to ~800° C. showed a small change in the weight of $ASiO_2$ that is referred to the degradation of the amine functional groups. Above 800° C., no significant weight loss was observed, which is consistent with the findings of other researchers. See S. Yu, D. Gu, B. Lin, X. Zhang, X. Shen, and S. Cui, "Preparation of amine-modified $SiO_2$ aerogel from rice husk ash for $CO_2$ adsorption," *J. Porous Mater.*, vol. 24, pp. 455-461, 2017, incorporated herein by reference in its entirety. While in case of RHA, the first weight loss up to 400° C. was due to the release of moisture and other adsorbed gases. The second region with a significant decrease in weight extended up to 1000° C., which is related to the decomposition and co-condensation of silica component. See T. Suteewong, S. M. Gruner, L. A. Estroff, U. Wiesner, H. Sai, and M. Bradbury, "Synthesis and Formation Mechanism of Aminated Mesoporous Silica Nanoparticles," *Chem. Mater.*, vol. 24, pp. 3895-3905, 2012, incorporated herein by reference in its entirety.

Spectroscopic Characterizations

Figure 5:
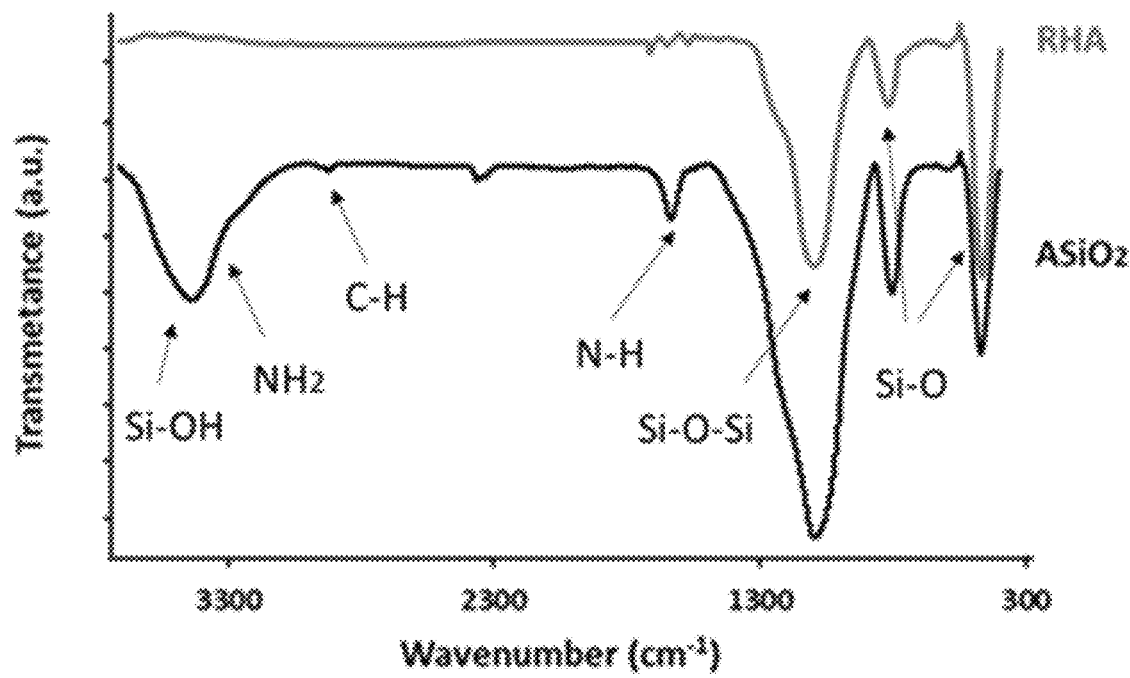
FIG. 5 is a graph illustrating the FTIR analysis of RHA and $ASiO_2$.

FTIR spectra of the silica-based materials are presented in FIG. 5 and the characteristic absorption bands can be observed for RHA and $ASiO_2$. The absorption bands of RHA at 466 cm$^{-1}$ is ascribed for Si—O distortion, 800 cm$^{-1}$ accredited to Si—O bending, and Si—O—Si was stretching at 1078 cm$^{-1}$. See B. Bera and N. Das, "Synthesis of high surface area mesoporous silica SBA-15 for hydrogen storage application," *Int. J. Appl. Ceram. Technol.*, vol. 16, pp. 294-303, 2019, incorporated herein by reference in its entirety. After modification of RHA with 3-APTES, the peak at 790 cm-1 represent Si—O—C, addition peak appears at 3420 cm$^{-1}$ related to a hydroxyl group (Si—OH), while the peak at 3360 and 3240 cm$^{-1}$ are related to —NH$_2$. The peak at 2920 cm$^{-1}$ represents the C—H stretching of —CH$_2$ and peak at 1630 cm$^{-1}$ related to the bending of amine N—H. See T. Suteewong, S. M. Gruner, L. A. Estroff, U. Wiesner, H. Sai, and M. Bradbury, "Synthesis and Formation Mechanism of Aminated Mesoporous Silica Nanoparticles," *Chem. Mater.*, vol. 24, pp. 3895-3905, 2012; T. Sakpal, A. Kumar, S. Kamble, and R. Kumar, "Carbon dioxide capture using amine functionalized silica gel," *Indian J. Chem.*, vol. 51, pp. 1214-1222, 2012; S. Peng, Y. Deng, W. Li, J. Chen, H. Liu, and Y. Chen, "Aminated mesoporous silica nanoparticles for the removal of low-concentration malodorous aldehyde gases," *Environ. Sci. Nano*, vol. 5, pp. 2663-2671, 2018; and K. S. Aneja, S. Bohm, A. S. Khanna, and H. L. M. Bohm, "Graphene based anticorrosive coatings for Cr(VI) replacement," *Nanoscale*, vol. 7, pp. 17879-17888, 2015, each incorporated herein by reference in their entirety.

Figure 6:
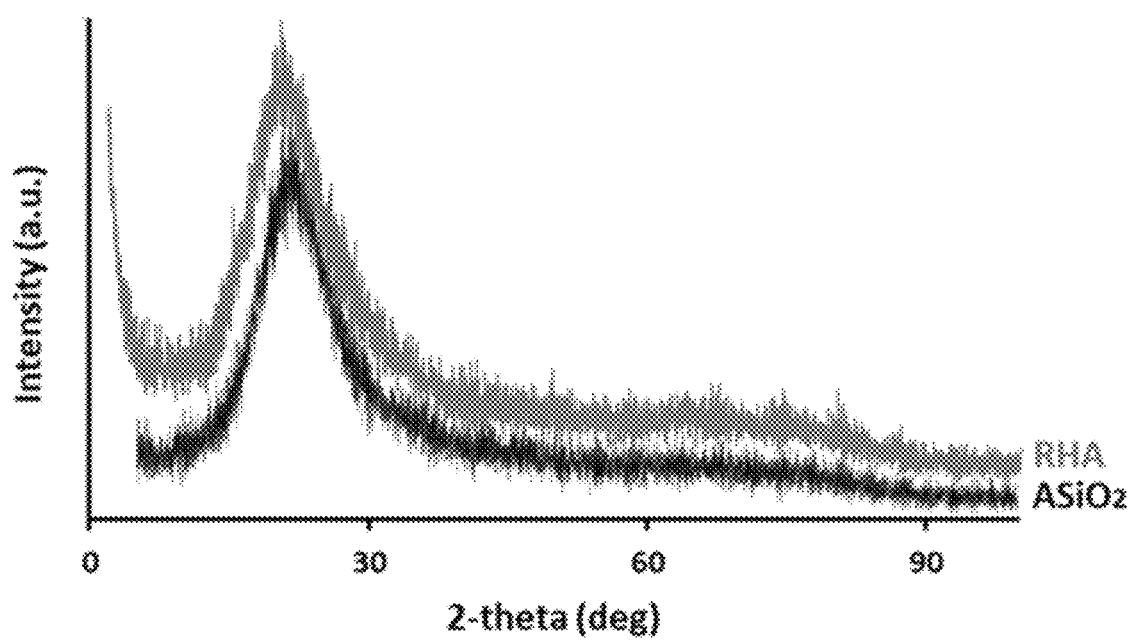
FIG. 6 is a graph illustrating the XRD patterns of RHA and $ASiO_2$.

FIG. 6 shows X-ray diffraction (XRD) patterns of RHA and ASiO$_2$. A broad peak appeared around 2θ=25° represents the semi-amorphous nature of the prepared materials. The XRD analysis shows that the structural properties of the prepared ASiO$_2$ were maintained after modification.

Gas Adsorption Behavior

Figure 7:
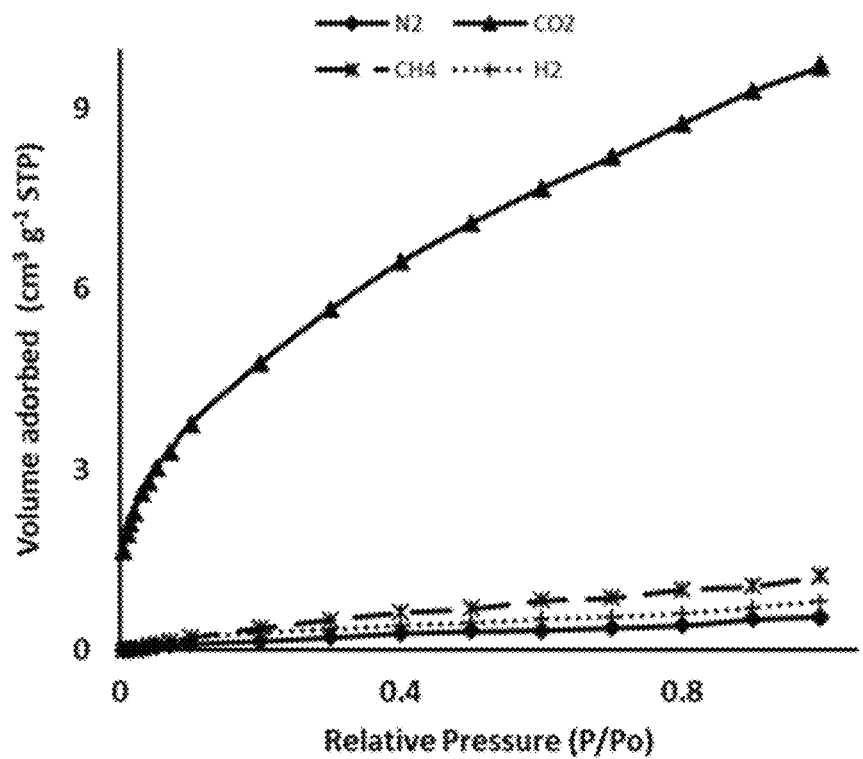
FIG. 7 is a graph illustrating the adsorption isotherm of $ASiO_2$ of different gases at 298 K.
Figure 8:
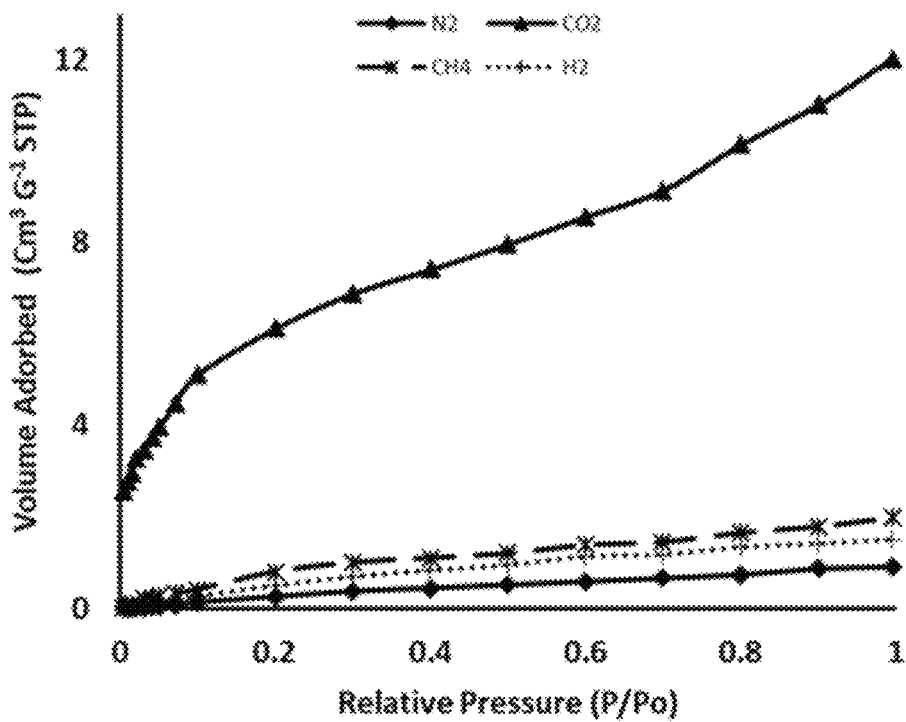
FIG. 8 is a graph illustrating the adsorption isotherm of $ASiO_2$ of different gases at 273 K.
Figure 9:
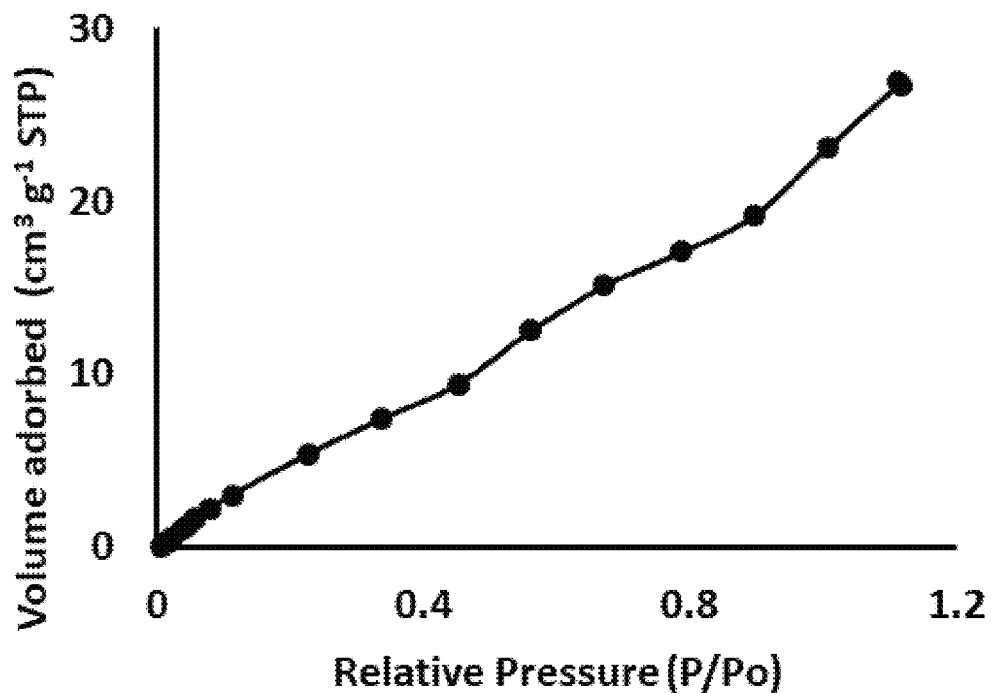
FIG. 9 is a graph illustrating the adsorption isotherm of hydrogen on $ASiO_2$ at 77 K.

The adsorption isotherms of CO$_2$, CH$_4$, H$_2$, and N$_2$ on ASiO$_2$ at different temperatures are shown in FIGS. 7-9. The adsorption capacity was found to increase with the decrease in temperature. Consistent results were obtained from DFT calculations which shows an increase in the binding energy as the temperature decreases (Table 3). The results also revealed that ASiO$_2$ has a low adsorption capacity of CH$_4$, H$_2$, and N$_2$ while it has a good affinity to adsorb CO$_2$. Based on the binding energy and bond distance between the adsorbent and adsorbate, the same behavior was observed in the DFT calculation (Table 3) that showed a higher affinity of ASiO$_2$ to adsorb CO$_2$ than CH$_4$, H$_2$ or N$_2$.

The adsorption mechanism of CO$_2$ by using aminated silica can be explained through the formation of ammonium carbonate according to the following equations (See N. Gargiulo, A. Peluso, P. Aprea, F. Pepe, and D. Caputo, "CO2 adsorption on polyethylenimine-functionalized SBA-15 mesoporous silica: Isotherms and modeling," *J. Chem. Eng. Data*, vol. 59, pp. 896-902, 2014, incorporated herein by reference in its entirety):

$$CO_2 + 2RNH_2 \rightarrow RNHCOO^- + RNH_3^+$$

$$CO_2 + R_2NH \rightarrow R_2NCOO^- + R_2NH_2^+$$

$$CO_2 + R_2NH + R'NH_2 \rightarrow R_2NCOO^- + R'NH_3^+$$

The adsorption capacity of RHA for CO$_2$ was 0.33 mmol/g while ASiO$_2$ had an adsorption capacity for CO$_2$ of 0.43 mmol/g. This improvement in the adsorption capacity due to the amine functional group attached to the silica, as shown in the previous equation. These results are in good agreement with the DFT result that shows a decrease in the energy bandgap between HOMO/LUMO after functionalization of RHA with an amine group (FIG. 11B).

FIG. 7 exhibits an excellent gas separation behavior of ASiO$_2$ in which a CO$_2$/CH$_4$ separation factor (amount adsorbed of CO$_2$/amount adsorbed of CH$_4$) of 8.6 was achieved, while the separation factors of CO$_2$/N$_2$ and CO$_2$/H$_2$ gases were 21.6 and 12.3, respectively.

At 273 K, the adsorption isotherms (FIG. 8) showed the same general behavior of adsorption affinity with a slight decrease in the separation factors. The separation factors of CO$_2$/CH$_4$, CO$_2$/N$_2$, and CO$_2$/H$_2$ were 6, 13.5, and 7.7, respectively.

FIG. 9 showed a good affinity of ASiO$_2$ to uptake hydrogen at 77 K with an adsorption capacity of 1.2 mmol/g. The high binding energy of −63.2 kcal/mol (Table 3) suggests that this behavior can be related to the formation of hydrogen bonds between hydrogen and silicon.

Figure 10:
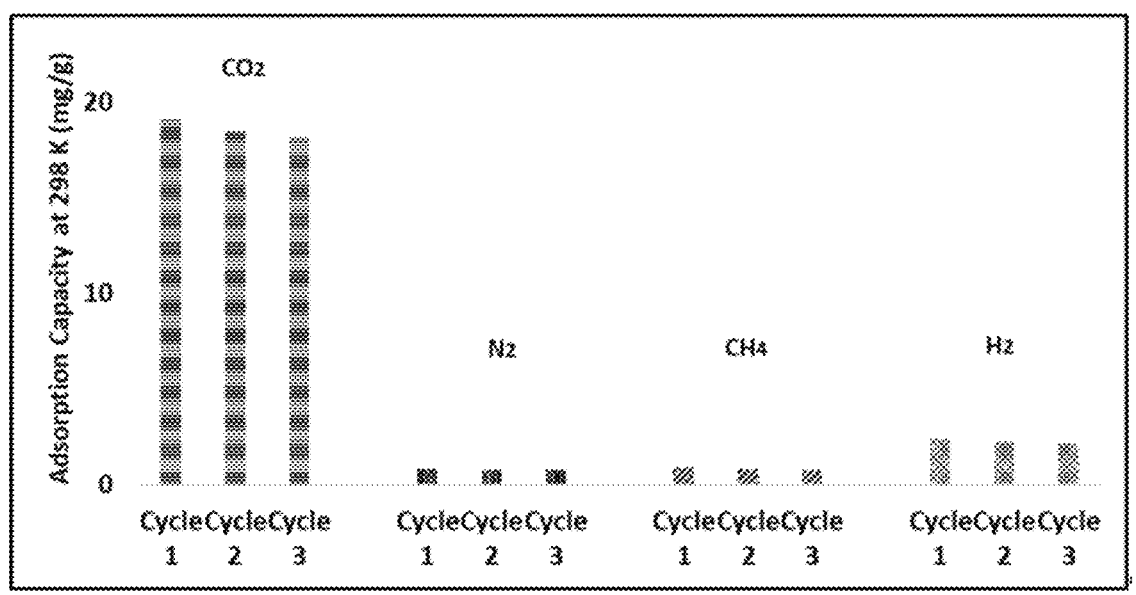
FIG. 10 is a graph illustrating the adsorption recycle of $CO_2$, $N_2$, $CH_4$ at 298 K and $H_2$ at 77 K on $ASiO_2$.

The reversibility of gas adsorption was investigated by back-to-back adsorption/desorption cycles, as shown in FIG. 10. The results showed around 5% reduction in the adsorption capacity of CO$_2$ between the 1$^{st}$ and 3$^{rd}$ cycle. In addition, the reduction in CH$_4$, N$_2$, and H$_2$ adsorption capacities after the 3$^{rd}$ cycle was about 10%, 6%, and 8%; respectively. This indicates that a small fraction of the adsorbed molecules cannot be recovered by a simple reduction of the pressure; it might also need an elevated temperature to desorb. If the adsorption/desorption cycles were repeated many more times, it is believed that the rate of decrease in adsorption capacity would diminish, and the amount adsorbed will be completely desorbed.

Table 2 shows a collection of data reported on gas adsorption on the silica-based materials. Comparable results were noticed for the adsorption capacity of CO$_2$ and H$_2$. However, higher values were also noticed due to differences in operating temperature or the specific surface area.

TABLE 2

Gas adsorption on different silica-based adsorbents

| Sample | CO$_2$ mmol/g | CH$_4$ mmol/g | H$_2$ mmol/g | N$_2$ mmol/g | Temp. K | Pressure atm | S$_{BET}$ (m$^2$/g) | Ref. |
|---|---|---|---|---|---|---|---|---|
| *ASiO$_2$ | 0.43 | 0.05 | 0.035 | 0.03 | 298 | 1 | 223 | Present |
| *ASiO$_2$ | 0.54 | 0.09 | 0.07 | 0.04 | 273 | 1 | 223 | Present |
| *ASiO$_2$ | | | 1.2 | | 77 | 1 | 223 | Present |
| APTS-MCM-41 | 0.54 | | | | 303 | 1 | 198 | a |
| SG-APTS | 0.9 | | | | 275 | 10 | 270 | b |
| SBA-PEI | 0.8 | | | | 298 | 1 | 5 | e |
| SBA-AP | 0.85 | | | | 293 | 1 | 562 | d |
| APTES-SiO$_2$ | 2.3 | | | | 273 | 1 | 654 | e |
| MCM-41 | | | 1.2-2.4 | | 77 | 1 | 916-1060 | f |
| MCF | | | 1.1 | | 77 | 1 | 600 | g |
| Pt-MCF | | | 1.5-2.5 | | | | 570-588 | |
| Al-MCF | | | 0.5-1.5 | | | | 322-498 | |
| SiO$_2$ | | | 3 | | 77 | 1 | 4810 | h |
| SiO$_2$-OTiCl$_3$ | | | 1-2 | | | | 3350-4790 | |
| SBA-15 | | | 6-30 | | 77 | 1 | 702-3274 | i |
| RHA | | | 0.15 | | 77 | 1 | 14.05 | j |

* indicates inventive aminated siliceous adsorbent

REFERENCE a) F. Gao, J. Zhou, Z. Bian, C. Jing, J. Hu, and H. Liu, "Dynamic properties in $CO_2$ adsorption on amine-modified MCM-41," *J. Process Mech. Eng.*, vol. 227, no. 2, pp. 106-116, 2012; b) T. Sakpal, A. Kumar, S. Kamble, and R. Kumar, "Carbon dioxide capture using amine functionalized silica gel," *Indian J. Chem.*, vol. 51, pp. 1214-1222, 2012; c) N. Gargiulo, A. Peluso, P. Aprea, F. Pepe, and D. Caputo, "$CO_2$ adsorption on polyethylenimine-functionalized SBA-15 mesoporous silica: Isotherms and modeling," *J. Chem. Eng. Data*, vol. 59, pp. 896-902, 2014; d) A. Zukal, J. Jagiello, J. Mayerová, and J. Čejka, "Thermodynamics of CO2 adsorption on functionalized SBA-15 silica. NLDFT analysis of surface energetic heterogeneity," *Phys. Chem. Chem. Phys.*, vol. 13, no. 34, pp. 15468-15475, 2011; e) S. Yu, D. Gu, B. Lin, X. Zhang, X. Shen, and S. Cui, "Preparation of amine-modified SiO2 aerogel from rice husk ash for CO2 adsorption," *J. Porous Mater.*, vol. 24, pp. 455-461, 2017; f) D. A. Sheppard and C. E. Buckley, "Hydrogen adsorption on porous silica," *Int. J. Hydrogen Energy*, vol. 33, pp. 1688-1692, 2008; g) G. Melaet, V. Stavila, L. Klebanoff, and G. A. Somorjai, "The effect of aluminum and platinum additives on hydrogen adsorption on mesoporous silicates," *Phys. Chem. Chem. Phys.*, vol. 20, no. 17, pp. 12075-12083, 2018; h) N. S. Suraweera, A. A. Albert, J. R. Humble, C. E. Barnes, and D. J. Keffer, "Hydrogen adsorption and diffusion in amorphous, metal-decorated nanoporous silica," *Int. J. Hydrogen Energy*, vol. 39, pp. 9241-9253, 2014; i) B. Bera and N. Das, "Synthesis of high surface area mesoporous silica SBA-15 for hydrogen storage application," *Int. J. Appl. Ceram. Technol.*, vol. 16, pp. 294-303, 2019; j) D. K. Panchariya, R. K. Rai, E. A. Kumar, and S. K. Singh, "Silica rich MIL-101(Cr) for enhanced hydrogen uptake,"*J. Porous Mater.*, vol. 14, no. 20, p. 3728-3735, 2019, each incorporated herein by reference in their entirety.

herein by reference in its entirety. Molecules having lower energy gaps are predicted to exhibit high charge transfer characteristics and are therefore more reactive. Frontier orbital distribution analysis (FIG. 11B) showed that the HOMO-LUMO orbitals were fairly distributed across the silica fragment in both adsorbents. Furthermore, functionalization of silica with APTES led to a significant decrease in the energy gap from 3.862 eV to 1.446 eV, which consequently implies a substantial increase in reactivity towards the adsorbed gases. Besides, global hardness ($\eta$) of the adsorbents which expresses their tendency to donate their non-bonding electrons during interactions revealed that functionalization of silica led to a significant decrease in hardness and a consequent increase in charge transferability.

Moreover, interactions of the adsorbents with $CO_2$, $CH_4$, $H_2$, and $N_2$ gases were further simulated at 298 K and 273 K while interactions at 77 K were simulated for $H_2$ gas alone. The optimized structures representing the lowest energy conformers of the adsorbed gases onto the adsorbents at 298 K are presented in FIGS. 12A-12D. Bond properties of the isolated adsorbents and the adsorbent-gases complexes at 298 K, 273 K, and 77 K (for $H_2$ alone) were also obtained. While no significant changes in the bond properties of pure silica were obtained as a result of adsorption of the gases; slight changes were visible in the APTES-functionalized silica ($ASiO_2$) due to enhancement in charge transfer characteristics which resulted in enhanced interactions with the gases. For instance, the Si1-O1 bond was shorter in the $CO_2$ adsorbed complex (1.885 Å) compared to the isolated adsorbent (1.905 Å), while the Si1-O2 bond was elongated (from 2.042 Å to 2.057 Å). The bond angles Si1-O1-Si2 also increased from 95.9 deg. in the isolated adsorbent to 97.2 deg. in the $CO_2$ adsorbed complex. In addition, the binding distances between pristine silica and the gases at 298 K; $CO_2$ (2.891 Å), $CH_4$ (3.233 Å), $H_2$ (4.115 Å) and $N_2$ (3.746 Å) as opposed to 1.609 Å, 2.365 Å, 2.411 Å and 3.176 Å in APTES-functionalized silica ($ASiO_2$)

TABLE 3

Adsorption energies and binding distances of $CO_2$, $CH_4$, $H_2$ and $N_2$ on silica and silica-APTES ($ASiO_2$)

| | | Silica | | Silica-APTES ($ASiO_2$) | | |
| --- | --- | --- | --- | --- | --- | --- |
| Temperature | Gases | $\Delta E_{ads}$ (kcal/mol) | Binding distance (Å) | Gases | $\Delta E_{ads}$ (kcal/mol) | Binding distance (Å) |
| 298 K | $CO_2$ | −8.65 | 2.891 | $CO_2$ | −17.6 | 1.609 |
| | $CH_4$ | −7.00 | 3.233 | $CH_4$ | −14.5 | 2.365 |
| | $H_2$ | −3.80 | 4.115 | $H_2$ | −12.0 | 2.411 |
| | $N_2$ | −6.34 | 3.746 | $N_2$ | −9.2 | 3.176 |
| 273 K | $CO_2$ | −11.7 | 2.891 | $CO_2$ | −29.5 | 1.505 |
| | $CH_4$ | −10.2 | 2.233 | $CH_4$ | −20.0 | 2.032 |
| | $H_2$ | −5.04 | 4.092 | $H_2$ | −15.6 | 2.241 |
| | $N_2$ | −9.47 | 3.705 | $N_2$ | −14.0 | 2..982 |
| 77 K | $H_2$ | −25.9 | 3.562 | $H_2$ | −63.2 | 2.056 |

Computational Results

Figure 11A:
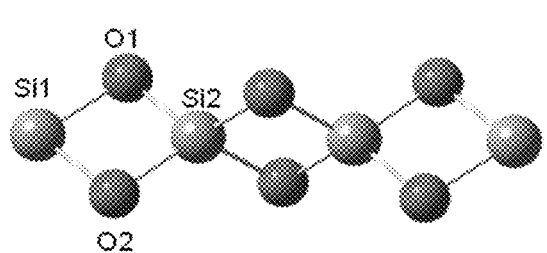
FIGS. 11A-11B illustrate the optimized molecular structures (FIG. 11A) and frontier orbital distributions (FIG. 11B) of silica cluster, $Si_4O_6$ (left) and silica-APTES (right)
Figure 11A:
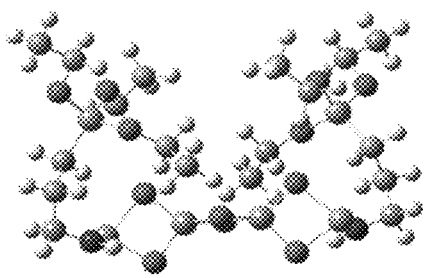
Figure 11B:
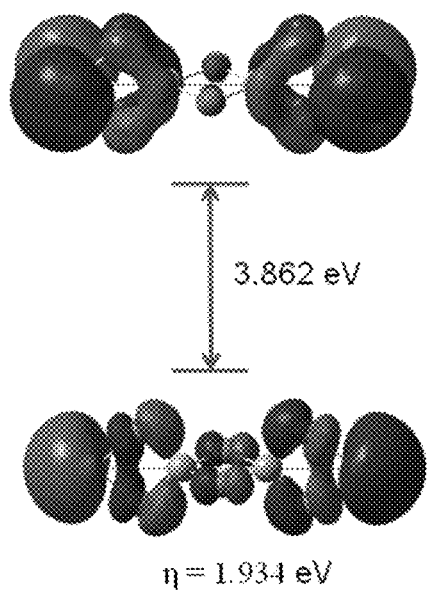
Figure 11B:
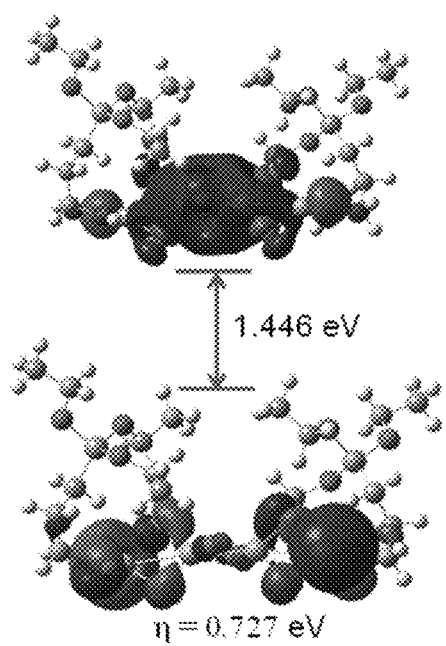
Figure 12A:
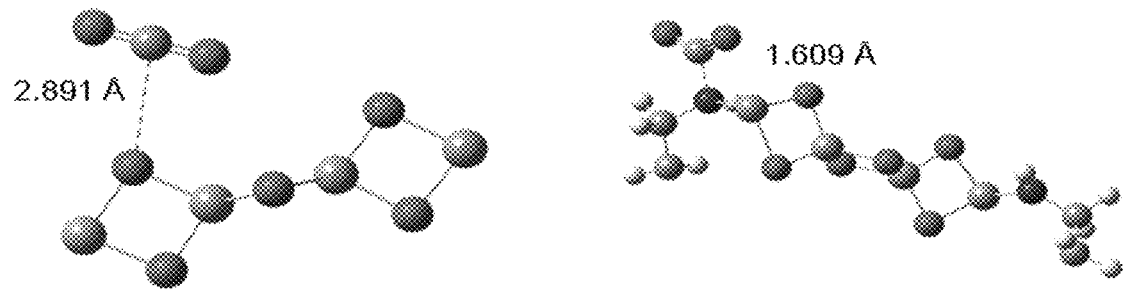
FIGS. 12A-12D illustrate the optimized adsorption of (FIG. 12A) $CO_2$, (FIG. 12B) $CH_4$, (FIG. 12C) $H_2$ and (FIG. 12D) $N_2$ on silica, $Si_4O_6$ (left) and silica-APTES (right) at 298 K.
Figure 12B:
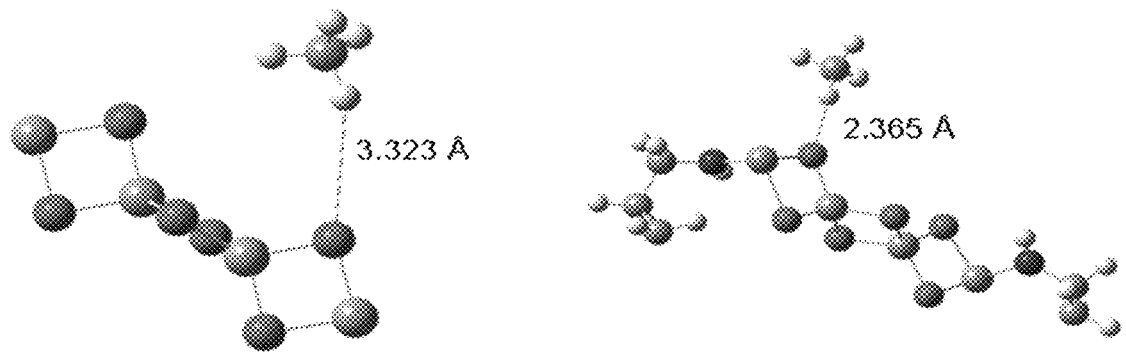
Figure 12C:
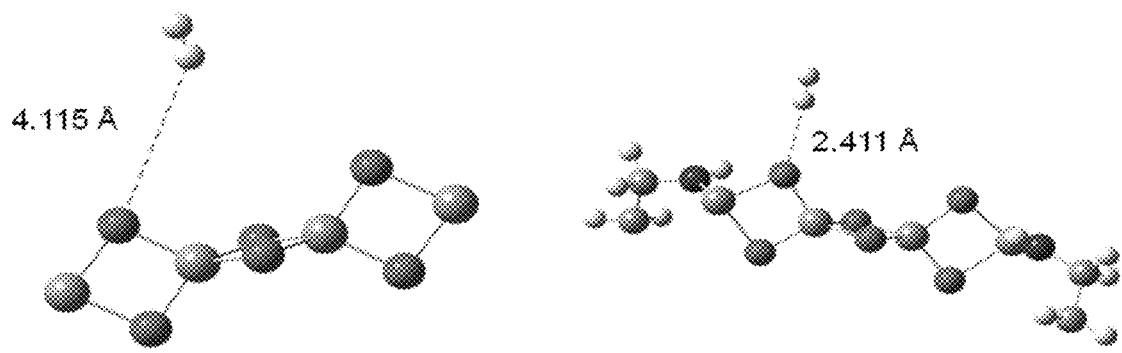
Figure 12D:
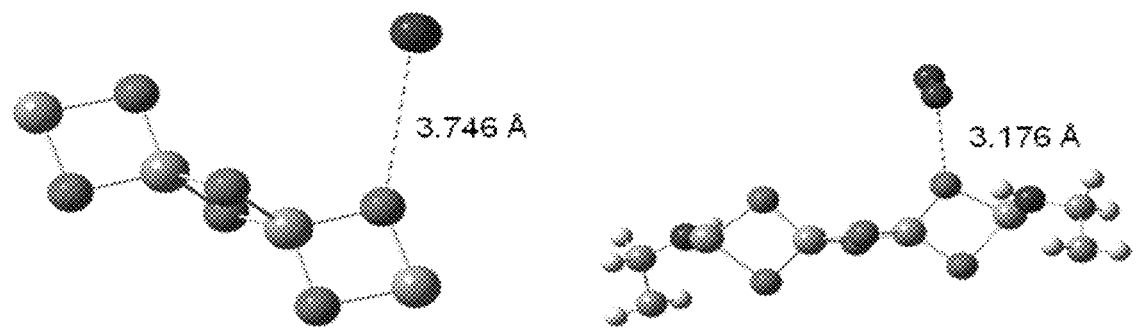

FIGS. 11A and 11B show the optimized molecular structures of silica ($Si_4O_6$), APTES-functionalized silica, and their frontier orbital distribution. As predicted from the molecular orbital theory, the effectiveness of interaction between two reacting molecules is dependent on their frontier orbitals (HOMO/LUMO) distribution, and the energy gap maintained within. See I. Abdulazeez, C. Basheer, and A. A. Al-Saadi, "Selective colorimetric sensing of nickel (II) ions using 2-hydroxy-5-nitrobenzaldehyde-4-hydroxybenzoylhydrazone ligand: Spectroscopic and DFT insights," *J. Mol. Liq.*, vol. 264, pp. 58-65, August 2018, incorporated further revealed that the gases only undergo weak physical adsorptions onto pristine silica due to weak van der Waals interactions between the silica surface and the gas molecules which apparently resulted in low adsorption energies. Adsorptions of the gases on APTES-functionalized silica were more favorable with more negative adsorption energies and shorter binding distances due to the increase in surface interactions. Furthermore, APTES-functionalized silica showed more affinity to $CO_2$ with an adsorption energy, $\Delta E_{ads}$ of −17.6 kcal/mol (at 298 K), relative to $CH_4$ (−14.5 kcal/mol), $H_2$ (−12.0 kcal/mol) and $N_2$ (−9.2 kcal/mol) gases, and −29.5 kcal/mol (at 273 K), relative to $CH_4$ (−20.0 kcal/mol), $H_2$ (−15.6 kcal/mol) and $N_2$ (−14.0 kcal/mol) as found from experimental studies. The relatively stronger adsorption of $CO_2$ onto APTES-functionalized silica resulting in binding distances 1.609 Å (298 K) and 1.505 Å (273 K) could be due to enhancement in basicity character of the adsorbent upon functionalization which led to chemical interaction (chemisorption) with $CO_2$ as implied by the binding distances and according to the hard-soft acid-base (HSAB) principle. See R. A. Olsen, P. H. T. Philipsen, and E. J. Baerends, "CO on Pt(111): A puzzle revisited," *J. Chem. Phys.*, vol. 119, no. 8, pp. 4522-4528, August 2003; D. E. Jiang and E. A. Carter, "Adsorption and dissociation of CO on Fe(110) from first principles," *Surf. Sci.*, vol. 570, no. 3, pp. 167-177, October 2004; and R. G. Parr and P. K. Chattaraj, "Principle of maximum hardness," *J. Am. Chem. Soc.*, vol. 113, no. 5, pp. 1854-1855, February 1991, each incorporated herein by reference in their entirety. Overall, DFT results are in good correlation with experimental data and showed that functionalization of silica with APTES led to an increase in adsorption efficiency, and adsorption efficiency increases with a decrease in temperature.

Therefore, the utilization of agriculture waste material (rice husk) was successfully achieved by functionalizing a siliceous material prepared therefrom (rice husk ash, RHA) with 3-APTES to get aminated silica ($ASiO_2$). Quantum chemical DFT calculations revealed that the functionalized material ($ASiO_2$) led to a decrease in HOMO-LUMO energy gap, a corresponding decrease in hardness and an increase in charge transfer characteristics resulting in higher interactions with the studied gases. The adsorption capacity of gases on $ASiO_2$ increased in the order $CO_2 > CH_4 > H_2 > N_2$, which was consistent with the DFT calculations in terms of adsorption energy and binding distance. Aminated silica showed a very good separation factor of $CO_2$ from the other studied gases at all temperatures of this investigation. The separation factor of $CO_2/N_2$ and $CO_2/CH_4$ at 298 K was 21.5 and 8.6, respectively. The good separation factor of $ASiO_2$ makes it a good candidate for natural gas separation and environmental $CO_2$ scrubbing applications.

The invention claimed is:

1. An aminated siliceous adsorbent, which is the reaction product of:
   dried acidified rice husk ash having disordered mesopores; and
   an amino silane;
   wherein amine functional groups are present on an external surface and within the mesopores of the dried acidified rice husk ash, and
   wherein the aminated siliceous adsorbent has a carbon content of 24 to 30 wt. %, based on a total weight of the aminated siliceous adsorbent.

2. The aminated siliceous adsorbent of claim 1, wherein the dried acidified rice husk ash has an oxygen content of 40 to 46 wt. % and a silicon content of 34 to 40 wt. %, each based on a total weight of the dried acidified rice husk ash.

3. The aminated siliceous adsorbent of claim 1, wherein the amino silane contains one amino group per molecule.

4. The aminated siliceous adsorbent of claim 1, wherein the amino silane is of formula (I)

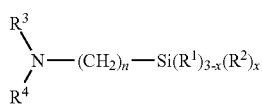

(I)

wherein
$R^1$ is an optionally substituted alkoxy, an optionally substituted aryloxy, or a halo;
$R^2$ is an optionally substituted alkyl, an optionally substituted aryl, or an optionally substituted arylalkyl;
$R^3$ and $R^4$ are independently hydrogen, an optionally substituted alkyl, an optionally substituted aryl, or an optionally substituted arylalkyl;
n is an integer of 2 to 16; and
x is 0, 1, or 2.

5. The aminated siliceous adsorbent of claim 4, wherein $R^1$ is methoxy or ethoxy, $R^2$ is methyl, ethyl, phenyl, or benzyl, $R^3$ and $R^4$ are each hydrogen, n is 2 or 3, and x is 0 or 1.

6. The aminated siliceous adsorbent of claim 1, wherein the amino silane is 3-aminopropyl triethoxysilane.

7. The aminated siliceous adsorbent of claim 1, wherein the aminated siliceous adsorbent has an oxygen content of 35 to 41 wt. %, a silicon content of 28 to 34 wt. %, and a nitrogen content of 0.5 to 6 wt. %, each based on a total weight of the aminated siliceous adsorbent.

8. The aminated siliceous adsorbent of claim 1, which has a surface area of 90 to 110 m²/g.

9. The aminated siliceous adsorbent of claim 1, which has a pore volume of 0.14 to 0.22 cm³/g.

10. The aminated siliceous adsorbent of claim 1, which has a mean pore diameter of 2.7 to 3.3 nm.

11. The aminated siliceous adsorbent of claim 1, which has a $CO_2$ uptake capacity of 0.4 to 0.46 mmol/g at 298 K and 1 atm, a $CO_2$ uptake capacity of 0.5 to 0.6 mmol/g at 273 K and 1 atm, and a $H_2$ uptake capacity of 1 to 1.4 mmol/g at 77 K and 1 atm.

12. The aminated siliceous adsorbent of claim 1, which has an ideal selectivity of $CO_2/N_2$ of 20 to 24, $CO_2/H_2$ of 10 to 14, and an ideal selectivity of $CO_2/CH_4$ of 6 to 10.

13. A method of making the aminated siliceous adsorbent of claim 1, the method comprising:
   ashing an acid treated rice husk at 600 to 800° C. for 1 to 12 hours to form a rice husk ash;
   acid treating the rice husk ash with hydrochloric acid to form an acidified rice husk ash;
   drying the acidified rice husk ash at 75 to 125° C. for 6 to 48 hours to form the dried acidified rice husk ash; and
   aminating the dried acidified rice husk ash with the amino silane at 100 to 140° C. for 12 to 48 hours.

14. The method of claim 13, wherein the amino silane is 3-aminopropyl triethoxysilane.

15. The method of claim 13, wherein the aminated siliceous adsorbent has an oxygen content of 35 to 41 wt. %, a silicon content of 28 to 34 wt. %, and a nitrogen content of 0.5 to 6 wt. %, each based on a total weight of the aminated siliceous adsorbent.

16. A method of capturing $CO_2$ from a gas mixture, the method comprising:
   contacting the gas mixture with the aminated siliceous adsorbent of claim 1 to adsorb at least a portion of the $CO_2$ into the aminated siliceous adsorbent, thereby forming a loaded aminated siliceous adsorbent and a gas stream depleted in $CO_2$ compared to the gas mixture.

17. The method of claim 16, wherein the gas mixture further comprises at least one other gas selected from the group consisting of hydrogen, oxygen, nitrogen, methane, and carbon monoxide.

18. The method of claim 16, wherein the gas mixture is a pre-combustion gas mixture comprising 15 to 50 vol. % of $CO_2$, based on a total volume of the gas mixture.

19. The method of claim 16, wherein the gas mixture is a post-combustion gas mixture comprising 5 to 15 vol. % of $CO_2$, based on a total volume of the gas mixture.

20. The method of claim 16, wherein the gas stream depleted in $CO_2$ contains at least 25% less $CO_2$ by volume compared to a volume of $CO_2$ present in the gas mixture.

* * * * *